United States Patent
Garvey et al.

(10) Patent No.: US 12,192,063 B2
(45) Date of Patent: Jan. 7, 2025

(54) NETWORK INVENTORY MANAGEMENT SYSTEM

(71) Applicant: Network Capacity Solutions, Inc., Arlington, VA (US)

(72) Inventors: Steven Garvey, Arlington, VA (US); Gabriel Venturi, Arlington, VA (US)

(73) Assignee: Network Capacity Solutions, Inc., Arlington, VA (US)

( * ) Notice: Subject to any disclaimer, the term of this patent is extended or adjusted under 35 U.S.C. 154(b) by 0 days.

(21) Appl. No.: 18/370,812

(22) Filed: Sep. 20, 2023

(65) Prior Publication Data

US 2024/0106713 A1 Mar. 28, 2024

Related U.S. Application Data

(60) Provisional application No. 63/409,313, filed on Sep. 23, 2022.

(51) Int. Cl.
*H04L 41/12* (2022.01)
*H04L 41/02* (2022.01)

(52) U.S. Cl.
CPC ............ *H04L 41/12* (2013.01); *H04L 41/024* (2013.01)

(58) Field of Classification Search
CPC ............................. H04L 41/12; H04L 41/024
See application file for complete search history.

(56) References Cited

U.S. PATENT DOCUMENTS

| | | | | |
|---|---|---|---|---|
| 9,979,627 B2* | 5/2018 | Shetty | .................... | H04L 45/02 |
| 10,484,267 B2* | 11/2019 | Gerstel | .................... | H04L 41/40 |
| 2007/0115984 A1* | 5/2007 | Kumar | .................... | H04L 45/60 |
| | | | | 370/392 |
| 2018/0089306 A1* | 3/2018 | Pal | .................... | G06F 16/24535 |
| 2023/0113327 A1* | 4/2023 | Banerjee | .............. | H04L 67/147 |
| | | | | 709/226 |

OTHER PUBLICATIONS

Selma et al., "Mapping Discovery Methodology in a pure P2P mediatino system for XML Schemas", 10th International Conference on Intelligent SystemsLTHeories and Applications (SITA), Oct. 20, 2015, IEEE Publishing.*
Lopes et al., "Network Verification in the Ligh of Program Verification" MSR, Rep (2013).*

* cited by examiner

*Primary Examiner* — Todd L Barker
(74) *Attorney, Agent, or Firm* — Millen, White, Zelano & Branigan P.C.; William F. Nixon

(57) ABSTRACT

A system and associated methods document and visualize complicated networks having circuits and circuit paths. The relationships between the circuits also are provided. The data regarding the circuits is preprocessed to be stored in a network resource database. When a network diagram is generated, the network resource database is queried to obtain the data and determine the different segments, devices, and relationships to model the network circuit. An intermediate table is generated to provide additional processing of queries back to the network resource database.

20 Claims, 17 Drawing Sheets

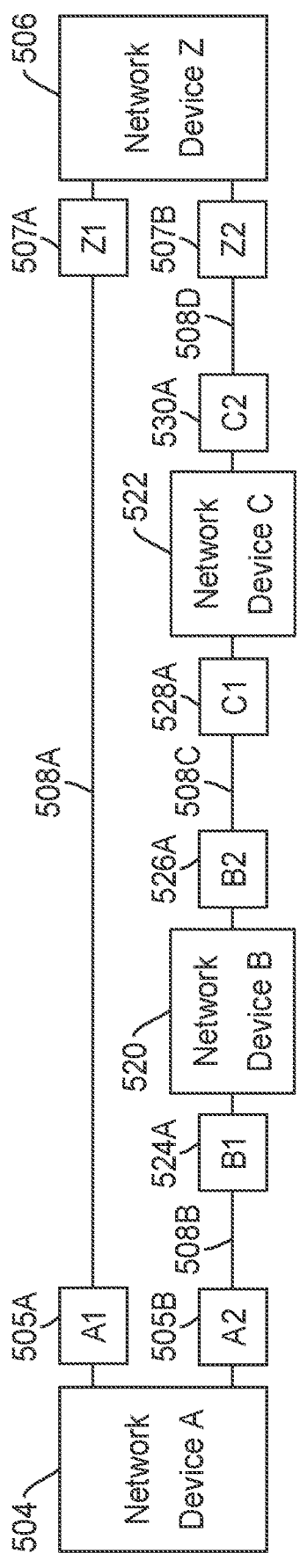
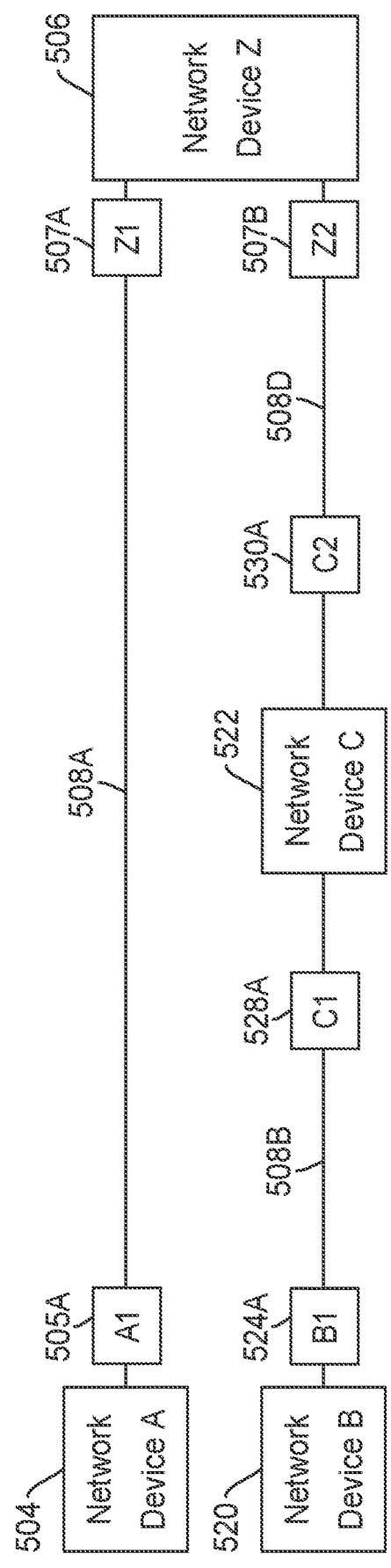

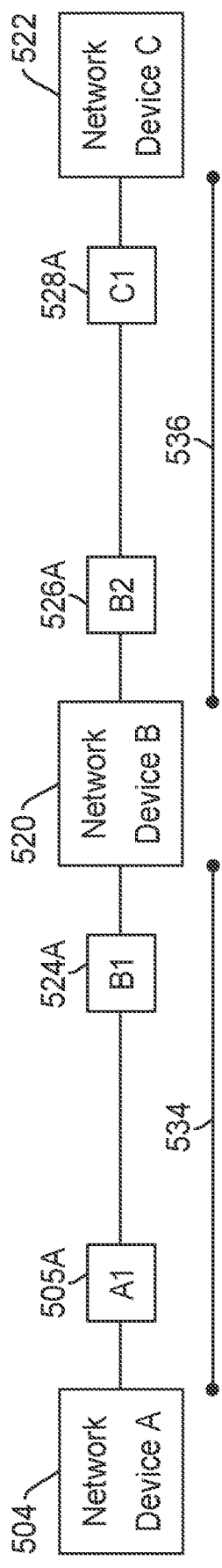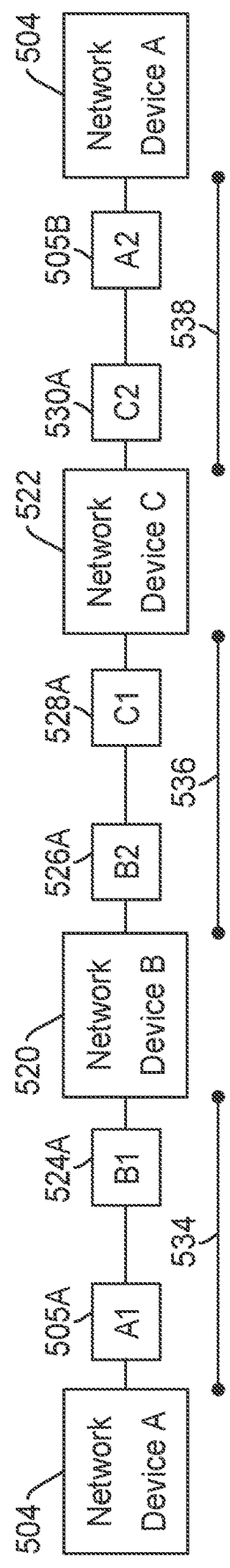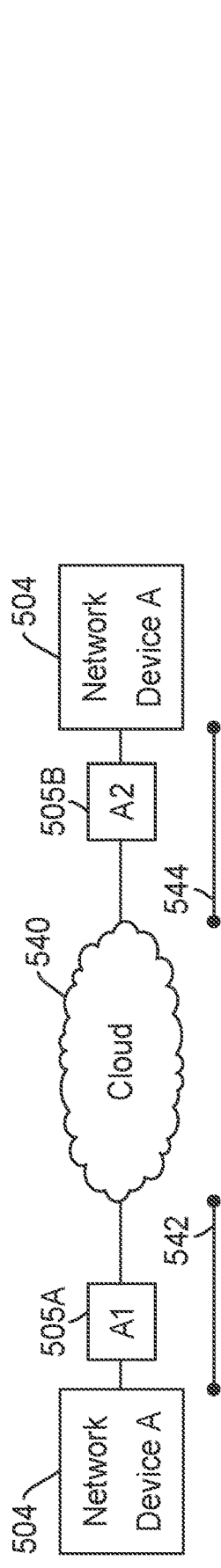

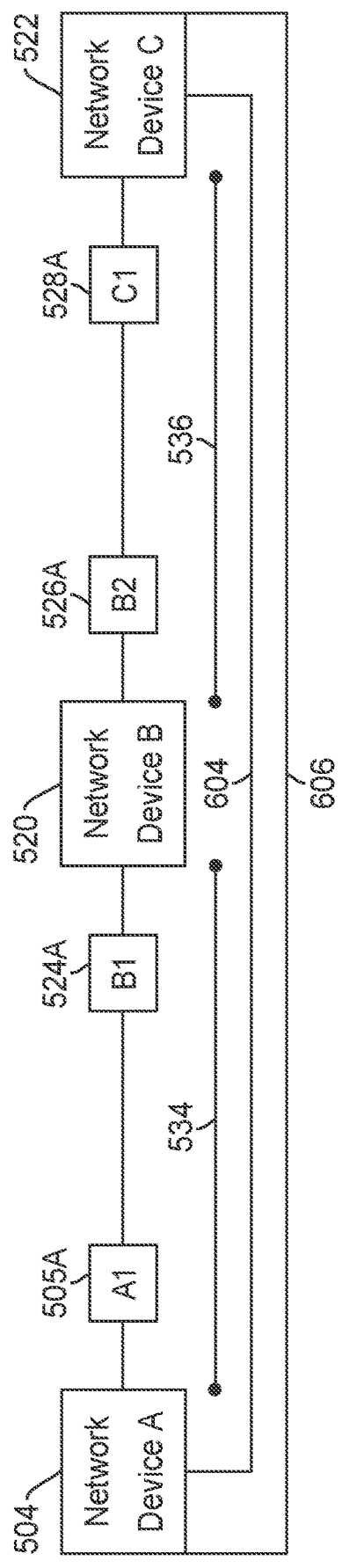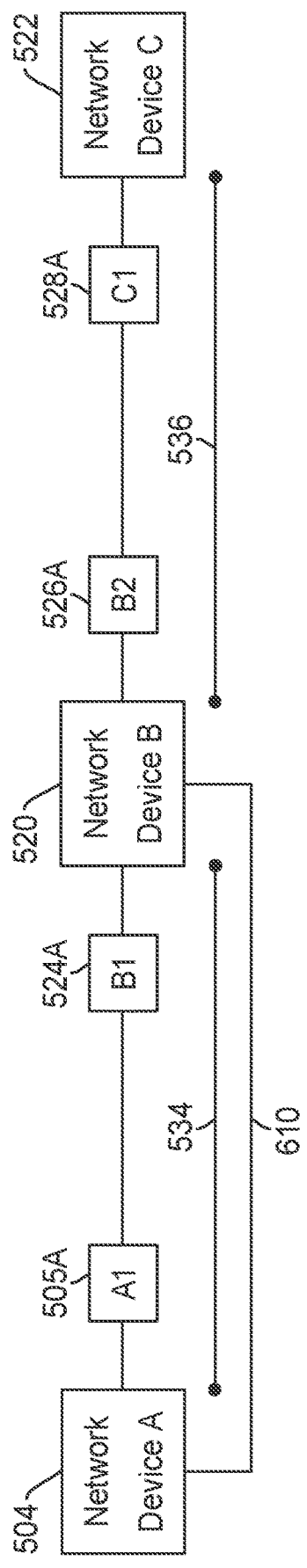

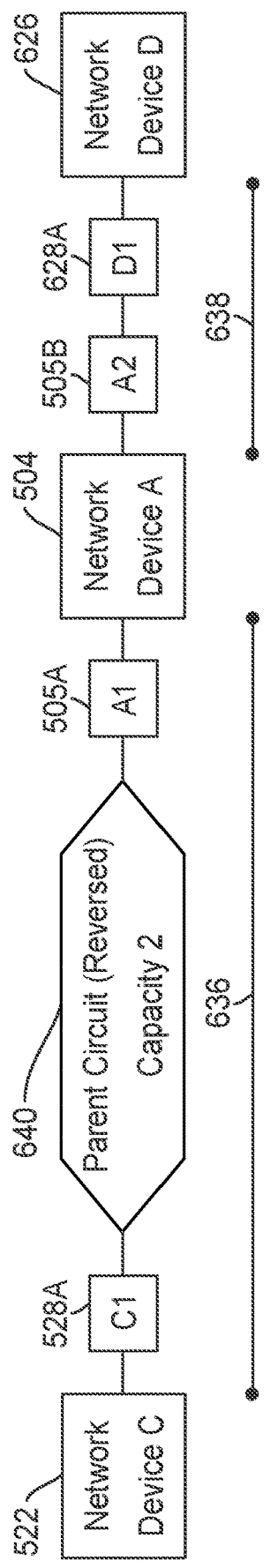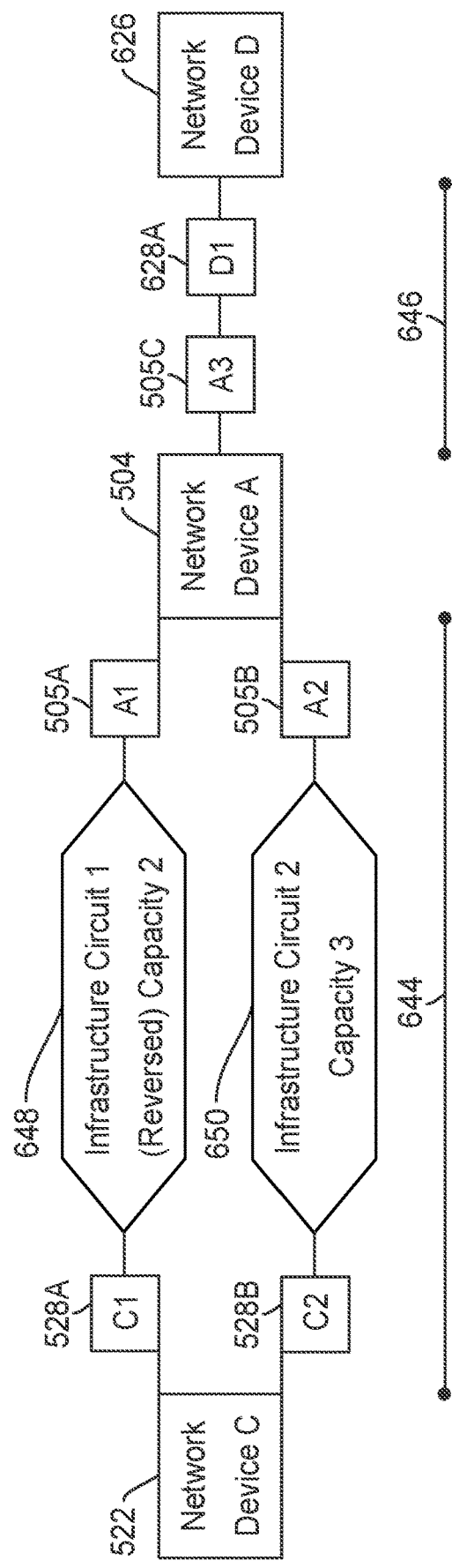

NETWORK INVENTORY MANAGEMENT SYSTEM

FIELD OF INVENTION

The technical subject matter of this application relates generally to the field of information technology resource management. Specifically, the claimed subject matter relates to managing the usage of capacity resources within a network environment as hardware assets are added, removed, and moved within the network.

BACKGROUND

Organizations are increasingly depending on distributed networks to provide on-demand data and software service access to users that are not co-located. Along with this dependency comes an increased expectation for reliable uptime, access consistency, and knowledgeable support. Higher levels of uptime, availability, and support require additional infrastructure in order to provide redundancy and consistent accessibility to users. These increased IT infrastructure needs can result in the acquisition of large numbers of hardware, cabling, racks, and other physical IT assets. Large volumes of physical IT assets create inventory management challenges. Inventory must be catalogued and stored in a manner that is easily accessible so that assets can be rapidly deployed to address network capability failures such as servers that must be taken down for unexpected maintenance.

Unlike other forms of physical inventory, IT assets must be catalogued with not only their physical identifiers and storage location, but also their capabilities information, or technical specifications so that assets can be quickly identified as meeting a network capability requirement. When a network capabilities failure occurs, the maintenance personnel must identify the type of IT asset needed to address the problem, as well as any technical specification requirements needed to be compatible with the relevant network environment. To ensure this compatibility of fit of an IT asset, it is critical to know the current topology of the network and thus know the path that the data for the line will follow.

SUMMARY

Various embodiments are directed to a system for managing the resource capabilities of a network infrastructure. The dynamic identification and updating of network resource capabilities as well as the available capacity of those capabilities may enable more accurate assessment of available network resource capabilities across various locations, and the easy relocation of network assets between locations.

One embodiment of the invention is a management computing device including a processor, a network communication interface, and a computer readable medium, coupled to the processor, the computer-readable medium comprising code, executable by the processor. The code may cause the processor to implement the steps of receiving, by the processor, an assignment instruction for a new network asset, wherein the assignment instruction includes a target location and asset data including asset type and capacity measurements for a network resource capability of the new network asset and adding the new network asset to an inventory database in association with the target location. The management computing device may then obtain a current total capacity measurement for the network resource capability for the target location, wherein the total capacity measurement indicates the total of available network resource capability for all network assets providing the network resource capability at the target location and update the total capacity measurement to include the capacity measurement of the new network asset.

Additional embodiments include methods and processor-executable code stored on non-transitory computer-readable media for network capacity inventory management. Systems for implementing the same are also contemplated as embodiments.

A method for managing network resources also is disclosed. The method includes populating a network resource database with a plurality of circuits. A circuit of the plurality of circuits includes at least one segment. The populating executes by determining a first path between two devices for the at least one segment. The two devices include a first device and a second device. The populating executes by identifying a capacity for the at least one segment. The capacity relates to a bandwidth available to the at least one segment. The populating executes by generating a data set for the circuit of the plurality of circuits. The data set includes the first path, the devices, and the capacity for all of the at least one segment with the respective circuit. The populating executes by storing the data set of the circuit of the plurality of circuits in the network resource database. The method also includes generating a query of the network resource database for a desired circuit of the plurality of circuits. The method also includes preprocessing the query including the data set of the circuit of the plurality of circuits. The method also includes returning a result for the desired circuit including the first path, the devices, and the capacity corresponding to the circuit of the data set.

A method for managing network resources using a network resource database also is disclosed. The method includes receiving a request for a desired circuit within a network. The method also includes querying the network resource database with information for the desired circuit. The method also includes retrieving data from a plurality of tables within the network resource database. The method also includes generating an intermediate table based on the data from the plurality of tables. The intermediate table includes data of a stored circuit related to the desired circuit. The method also includes further querying the plurality of tables for data related to a segment of the stored circuit. The method also includes updating the intermediate table with the data related to the segment. The method also includes producing a list of connection data from the data of the stored circuit for the desired circuit using the intermediate table.

A network capacity resource management system also is disclosed. The system includes a processor. The system also includes a memory in communication with the processor and having stored thereon, processor-executable instructions for configuring the processor to perform operations. The instructions include receiving a request for a desired circuit within a network. The instructions also include querying a network resource database within the network capacity resource management system with information for the desired circuit. The instructions also include retrieving data from a plurality of tables within the network resource database. The instructions also include generating an intermediate table based on the data from the plurality of tables. The intermediate table includes data of a stored circuit related to the desired circuit. The instructions also include further querying the plurality of tables for data related to a segment of the stored circuit. The instructions also include updating the intermediate table with the data related to the segment. The instructions also include producing a list of connection data from the data of the stored circuit for the desired circuit using the intermediate table.

Additional details regarding the specific implementation of these embodiments can be found in the Detailed Description and the Figures.

BRIEF DESCRIPTION OF THE DRAWINGS

FIG. 5E shows a connection segment having multiple parallel asymmetrical physical paths according to the disclosed embodiments.

FIG. 5F shows parallel paths for a connection segment according to the disclosed embodiments.

FIG. 5G shows a circuit path having two segments according to the disclosed embodiments.

FIG. 5H shows a circuit path having a ring topology according to the disclosed embodiments.

FIG. 5I shows a circuit path having a cloud according to the disclosed embodiments.

FIG. 6A shows an infrastructure circuit having network divisions according to the disclosed embodiments.

FIG. 6B shows a partial path may be designated by a network division in the infrastructure circuit according to the disclosed embodiments.

FIG. 6E shows a circuit path having a reversed infrastructure circuit according to the disclosed embodiments.

FIG. 6F shows a circuit path having segments with parallel physical connections according to the disclosed embodiments.

DETAILED DESCRIPTION

Figure 1:
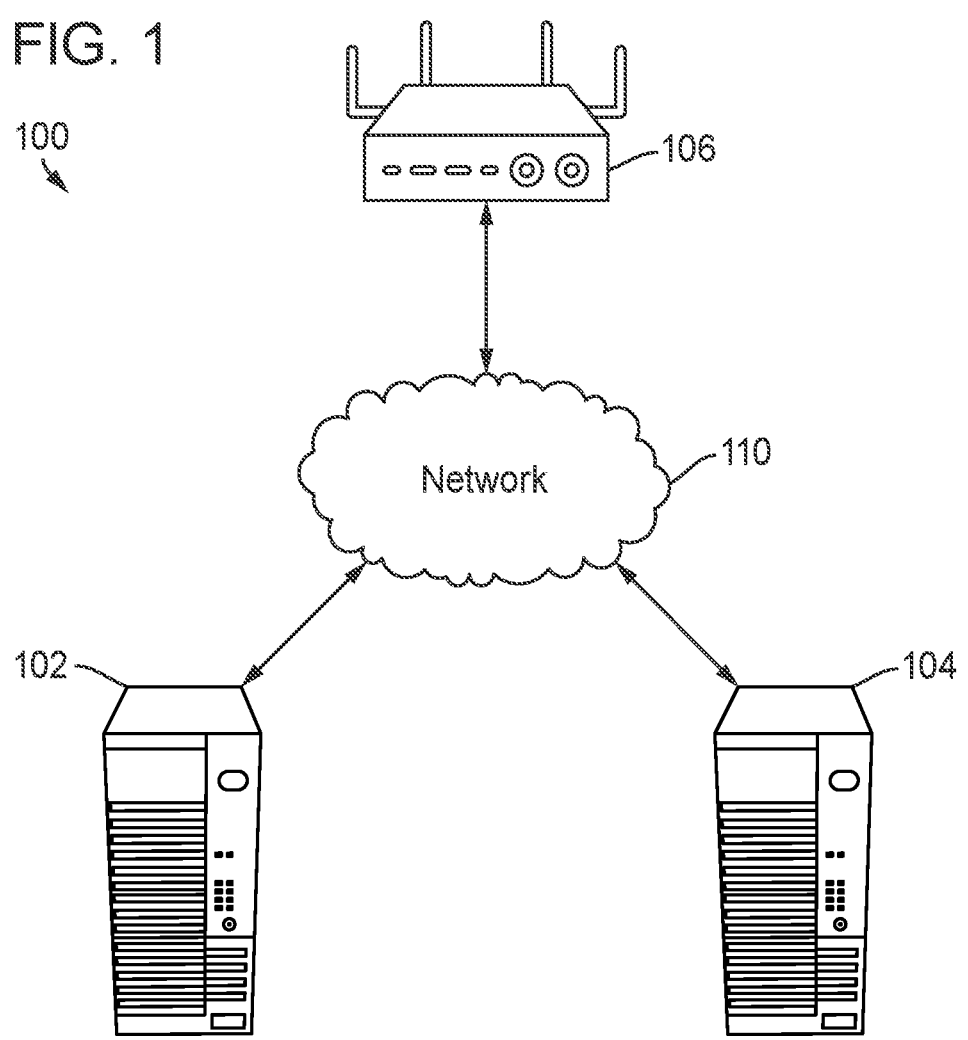
FIG. 1 shows a block diagram of a network environment suitable for implementing a network resource inventory management system according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments provide an improved method and system to document and visualize complicated networks having dozens, if not hundreds or more, of circuits and circuit paths. These circuit paths include many devices and their relationships to each other as well as other circuit paths. Circuit paths may reuse other circuit paths. Many circuits are virtual with the circuit path being comprised of any number of underlying physical connections. This information is difficult for customers and operators to track, especially when the network includes a wide variety of equipment from a number of vendors.

Each vendor may have a software application to show the connections on its equipment but they are unable to show the entire picture of what the network looks like. Further, the disclosed embodiments account for dark elements, like patch panels, where the physical connections pass through passive devices that cannot be queried in any fashion. The disclosed embodiments provide unique interfaces and visualization techniques that allow an operator or customer to view these relationships in an easy to read manner as well as one that is thorough in its representations.

Prior to discussing embodiments of the invention, some terms can be described in further detail.

An "inventory management computing device" may be a computing device that executes an application for network hardware intake and network capacity resource tracking. An inventory management computing device may generate digital representations of physical network hardware assets and assign capabilities of those network hardware assets to various nodes or locations within the information technology (IT) environment of an organization. The inventory management computing device may maintain one or more data stores of inventory data, location resources, network topology visualization, and other inventory management data. Analytics and statistics related to the events of a workflow process may be calculated, generated, and visualized by the inventory management computing device. This device may be a server, servers, workstations, personal computers (PC), tablets, and the like.

A "user computing device" may be any suitable computing device that can interact with a user. User computing devices may be in any suitable form. Some examples of user computing devices include cellular phones, PDAs, personal computers, tablet computers, workstations and the like.

A "display" may be any electronic output device that displays or renders data in a pictorial or textual format. Displays may include computing device monitors, touch-screen displays, projectors, and the like.

A "graphical user interface" may be an electronic means of providing a visual way to interact with a computing device using items such as windows, icons, and menus.

A "network communication interface" may be an electrical component that enables communication between two computing devices. A network communication interface may enable communications according to one or more standards such as 802.11, BlueTooth™, GPRS, GSM, 3G, 4G, 5G, Ethernet, or the like. The network communications interface may perform signal modulation/demodulation. The network communications interface may include digital signal processing (DSP). Some embodiments may include computing devices that include multiple communications interfaces to enable communications according to different protocols or standards.

An "electronic message" refers to an electronic message for self-contained digital communication that is designed to be transmitted between physical computing devices. Electronic messages include, but are not limited to transmission control protocol (TOP) messages, user datagram protocol (UDP) message, electronic mail, a text message, an instant message, transmit data, or a command or request to access an Internet site.

A "user" may include an individual or a computational device. In some embodiments, a user may be associated with one or more individual user accounts and/or mobile devices or personal computing devices. In some embodiments, the user may be an employee, contractor, or other person having access to make use of a networked computing environment.

An "inventory server," "inventory database," or "server computing device" is typically a powerful computer or cluster of computers. For example, the server computer can be a large mainframe, a minicomputer cluster, or a group of servers functioning as a unit. In one example, the server computer may be an inventory database server and may be coupled to a Web server. The server computing device may also be referred to as a server computer or server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable computer-readable device or devices that can store electronic data. A suitable memory may comprise a non-transitory computer readable medium that stores instructions that can be executed by a processor to implement a desired method. Examples of memories may comprise one or more memory chips, disk drives, removable memory, etc. Such memories may operate using any suitable electrical, optical, and/or magnetic mode of operation.

A "network asset" or "network hardware asset" may refer to physical components of an information technology (IT) environment or network infrastructure. Network assets may refer to network devices that form the core of any network. These devices enable the establishment of an efficient mechanism for the transfer of data from one hardware device to another. For example, network assets may include hubs, routers, switches, modems, bridges, network interface cards, servers, user devices, and the like.

A "network resource" may refer to intangible resources used to enable and support the operation of the IT environment or its subcomponents. These intangible resources be related to powering network assets, enabling data transmission or receipt, enabling data storage, etc. For example, bandwidth, power input/output, data storage, and other resources may be provided and, or used by the network hardware assets as part of enabling the IT environment. Each network asset may have multiple network resource associations. For example, a hub may have both power related network resource needs and bandwidth or data throughput needs. This is because the hub requires a certain amount of electrical input in order to function properly, and also has an average data throughput measurement. As such, the hub may have multiple network resource capacity measurements, one measurement for each network resource associated with the hub.

The term "asset data" may refer to data containing information about the technical specifications and network resource capabilities of a particular network asset. This may include a number of ports, the throughput of each port, the power consumption needs of the network asset, the type of interface for each port, the throughput measurement for each port, and a total throughput or usage for each network resource of the network asset. The total capacity measurement for each type of network resource may be the sum of the network resource capacity for each of the interfaces (e.g. ports, jacks, dongles etc.) associated with the network capacity resource.

Various examples of a network resource inventory management platform enable IT personnel to track not only the network assets at any location within a network environment, but also the available amount of any network resources. Network resources, intangible capabilities required to support IT environment operations, are difficult to track and maintain, because these resources may change often, and the number of these resources grows very large as the network environment becomes increasingly complex. The more network assets that are added to the network environment, the more network resources that are added and deducted from available capacity.

A network resource inventory management platform may be implemented within a networked environment. The platform has a front-end user interface that accepts submissions of new network assets to the platform as the assets are added to the network environment. Asset data is stored in a server or other data storage, and used to update the capacity measurements or available network resource capacities for a location within the network at which the new network asset is deployed. The front-end user interface is described herein as provided via software application on a management computing device, however the software application may be available throughout the network environment via various user devices according to permissions set by IT personnel. Existing network assets may be modified via the same front-end interface as network assets are moved to different locations with the network environment or their network resource capacities are changed (e.g., upgrades or component failures).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

FIG. 1 illustrates an exemplary system 100 for network resource inventory management and analysis according to various embodiments. With reference to FIG. 1, a network resource inventory management system 100 may track the intangible resources provided by various network hardware components located within various parts of a network environment. Network hardware devices such as network device 106 are entered into an inventory server 104 using an input means as described herein. Technical specifications and capacity for each resource of the network device 106 are added to the inventory server 104 and stored in association with the device.

Each network device 106 may have a number of intangible resources that it provides if installed in the network, as well as resource demands needs in order to operate. The network resource inventory management platform may create digital representations for the utilization of the intangible resources provided by network devices 106 across the network environment, and may track utilization across devices, network nodes, locations, and other partitions of the network environment. These various devices may be connected as part of network 110.

The system 100 may be a part of a broader organizational computing environment and may connect a management computing device 102 to various computing systems throughout the organization via a network 110. The system 100 can include any suitable network infrastructure including servers, data stores (i.e., databases), computing devices, mobile communication devices, etc. Data generated by other computing systems of the organization may be transferred and, or transmitted to the management computing device 102 by one or more infrastructure components. As illustrated in FIG. 1, one or more inventory servers 104 may transmit data related to network hardware, intangible network resources, and more to the inventory management computing device 102 via the network 110.

The management computing device 102 includes a combination of software, data storage, and processing hardware that enable it to operate as the central network device addition, network resource management, and network resource tracking engine for the system 100. Data is entered into the management computing device, scanned using a coded indicia scanner, or otherwise input into the management computing device 102 over network 110 for collection and aggregation in inventory server 104, which may organize and store the data. For each new piece of network hardware added to the system 100, the data collected includes technical specification, make, and model information for the network hardware device.

The technical specifications may include: internal hardware make and model; number, type, and capacity of input and output ports; number and type of interfaces; interfacing requirements (e.g., language, etc.); and energy consumption needs. This information may be used to effectively generate a digital twin of the network hardware device within the inventory management system 100. A device identifier may be assigned to the network hardware device during addition via the management computing device 102, or a pre-existing identifier such as a MAC address may be used to identify the device. The device identifier may be used as a key parameter in the inventory server 104 for linking the technical specification data and any other information stored in relation to the network hardware device.

If a newly added network hardware device is being deployed within the network 110, a location identifier, subnet information, or other grouping information will be stored as part of the digital twin or in association with the device identifier in the inventory server 104. Thus, after entry of the network hardware device into the management computing device 102, the digital twin of the network hardware device will be associated with a particular location or portion of the broader network. The management computing device 102 or the inventory server 104 may identify the network resource capacity of the network hardware device and add or subtract these resources for the current sum of resources at the location. If the network hardware device is not deployed in network at the time for addition to the network resource inventory management system, then the digital twin may be stored in the inventory server 104 without a current association to a location or portion of the network. Alternatively, the network hardware device may be assigned a generic location such as "spare," "storage," or "null" to indicate that it is not actively in use, such as in a warehouse.

The data store may be any suitable data storage in operative communication with the management computing device 102. For example, the data store may be stored in a memory of the inventory server 104 or in one or more external databases. Location of the data store within system 100 is fungible, such that the data store may sit within any portion of the system 100, so long as it is in communication with management computing device 102. The data store may retain data generated, modified, or otherwise published by various systems of the organization as part of network asset addition, movement, or deletion. The data store may also store visualization tools, models, analysis scripts, or other frequently used software code used to perform analysis of the stored data.

The management computing device 102 may employ multiple software models including programming code instructing a processor of the management computing device to analyze data received about the various network assets to the system and track the capacity of connections and network resources throughout the system 100. A number of models may be pre-loaded or pre-configured as part of a software application executing on the management computing device 102, to enable quick analysis of the network asset (e.g. network hardware devices) data stored in the inventory server 104.

Administrators may access model selection and perform data analysis via an inventory management application. Using the inventory management application, administrators may create templates or scripts including frequently used analysis models for execution. Similarly, templates or scripts of frequently used models may be pre-installed or preconfigured on the management computing device 102. Executing pathing analysis of network assets using the templates or scripts may cause the processor of the management computing device 102 to execute several analysis models or algorithms in the same processing session without additional instructions from an administrator.

Figure 2:
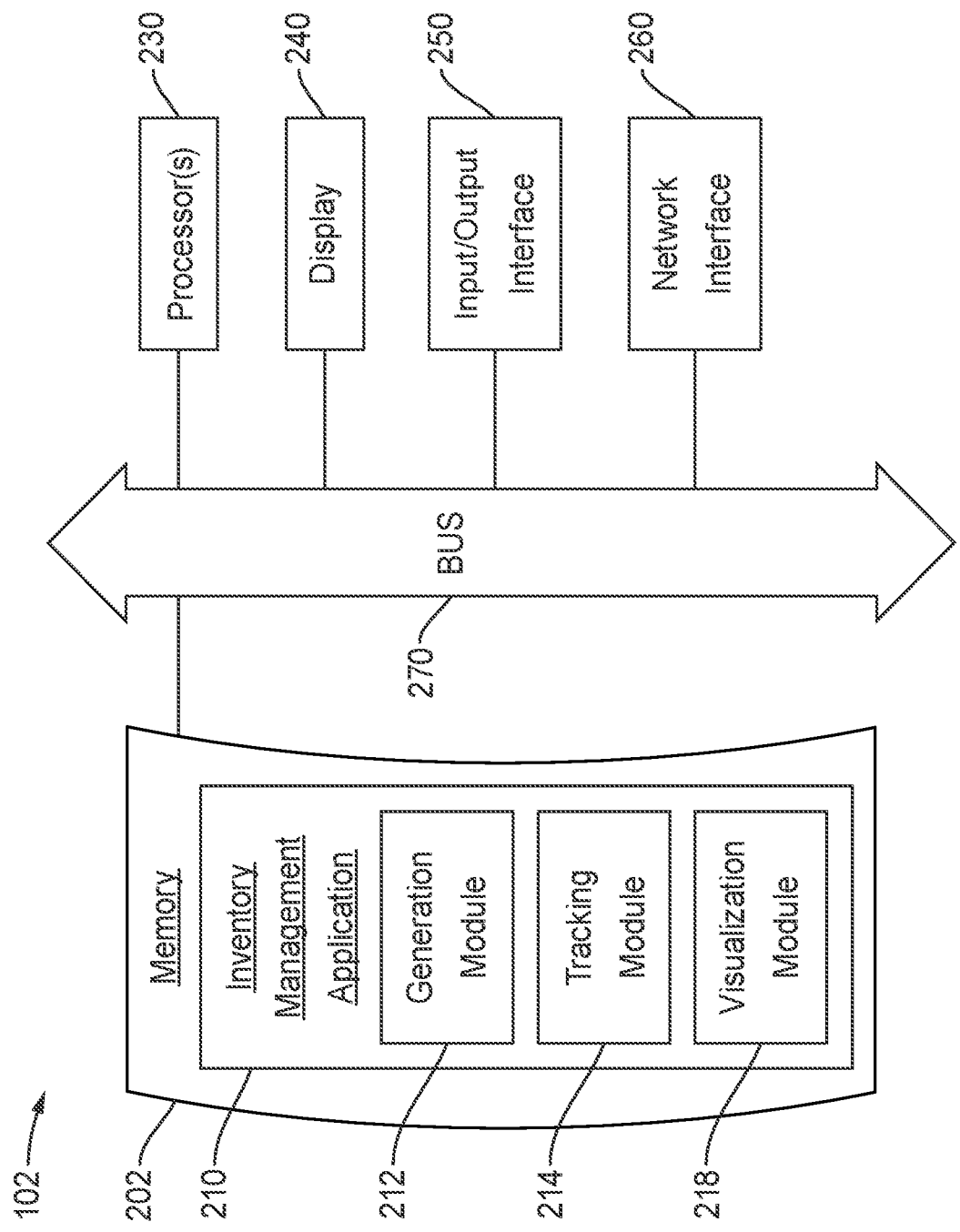
FIG. 2 shows a block diagram of an inventory management computing device according to the disclosed embodiments.

Referring now to FIG. 2, there is shown an example of a computer system within which a set of instructions, for causing the computing system to perform any one or more of the methods discussed herein, may be executed. With reference to FIGS. 1-2, the computer system may correspond to the management computing device 102 of FIG. 1. In some implementations, the management computing device 102 may support the generation, tracking, and analysis of network assets and their network resource capacities throughout a network 110 of system 100.

The management computing device 102 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, the management computing device 102 may be connected (e.g., via a network, such as a Local Area Network (LAN), an intranet, an extranet, or the Internet) to other computer systems. The management computing device 102 may operate in the capacity of a server or a client computer in a client-server environment, or as a peer computer in a peer-to-peer or distributed network environment. Management computing device 102 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting micro-services of an inventory management system.

The management computing device 102 includes a processing device such as a processor(s) 230, a memory 202 which includes multiples: a main memory (e.g., read-only memory (ROM), flash memory, dynamic random access memory (DRAM) (such as synchronous DRAM (SDRAM) or DRAM (RDRAM), etc.) and a static memory (e.g., flash memory; a static random access memory (SRAM), etc.), and a data storage device (e.g. data store), which communicate with each other via a bus 270.

Processor 230 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processor 230 may also be one or more special-purpose processing devices such as an application specific integrated circuit (ASIC), a field programmable gate array (FPGA), a digital signal processor (DSP), network processor, or the like. The processor 230 is configured to execute processing logic for performing the operations and steps discussed herein.

The management computing device 102 may further include a network communication interface 260 communicably coupled to a network 110. The management computing device 102 also may include a video display unit such as display 240 (e.g., a liquid crystal display (LCD) or a cathode ray tube (CRT)), an input/output interface 250 including an alphanumeric input device (e.g., a keyboard) and, or a cursor control device (e.g., a mouse), and an optional signal generation device (e.g., a speaker).

The memory 202 may include a computer-readable storage medium (e.g., a non-transitory computer-readable storage medium) on which may store instructions encoding any one or more of the methods or functions described herein, including instructions encoding an inventory management application 210 for implementing methods for supporting the management, analysis, and visualization of network resource inventory tracking may also reside, completely or partially, within volatile memory and/or within processor(s) 230 during execution thereof by the management computing device 102, hence, volatile memory of memory 202 and processor device 230 may also constitute machine-readable storage media.

The non-transitory machine-readable storage medium may also be used to store instructions to implement an inventory management application 210 for supporting the management, analysis, and visualization of a network resource inventory management system in a cloud-based system, and/or a software library containing methods that call the above applications. While the machine-accessible storage medium is shown in an example implementation to be a single medium included within memory 202, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Regardless of implementation of the computer-readable storage medium, the inventory management application 210 may contain one or more modules of processor-executable instructions for performing various routines and sub-routines of the methods described herein. For example, the inventory management application 210 may include a generation module 212 of instructions for executing the collection of data related to new network hardware devices, the generation of digital twins of those network hardware devices, and the generation of network resource capabilities values entries associated with the new network hardware device, which may be stored in association with the digital twin of the network hardware device or a location of the device. The inventory management application 210 may also include a tracking module 214 including instructions for calculating, monitoring, and modifying digital representations and values associated with the network resources connecting network hardware devices and locations.

The inventory management application 210 may also include modules of processor-executable instructions for performing operations related to the generation and visualization of the topography of a portion of the network 110 using the data. The visualization module 218 may include instructions for passing workflow data to one or more path mapping models to obtain a visual map of a portion of the network 110 and the network resources between nodes of the network. The instructions of visualization module 218 may include scripts, instruction templates, and other pre-determined code segments for analyzing data in frequently used sequences. The visualization module 218 may also generate charts, graphs, and other visualizations characterizing the network resource capacity analytics. Visualizations generated by the visualization module 218 include instructions for enabling the processor(s) 230 to render the visualization(s) on display 240.

Figure 3:
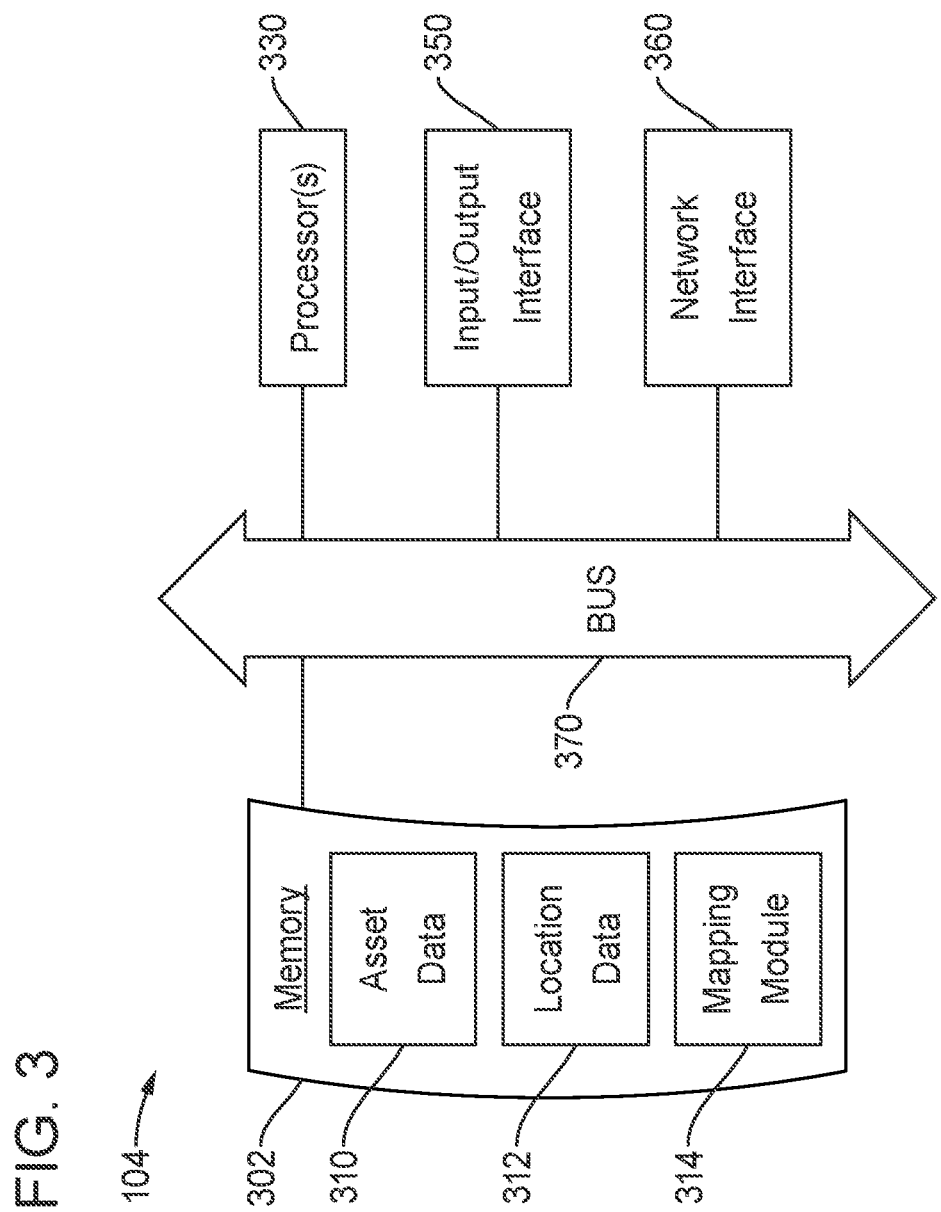
FIG. 3 shows a block diagram of an inventory server according to the disclosed embodiments.

Referring now to FIG. 3, there is shown an example of an inventory server 104 within which a set of instructions, for causing the computing system to perform any one or more of the methods discussed herein, may be executed. With reference to FIGS. 1-3, the inventory server 104 may correspond to any of the inventory server 104 A-D of FIG. 1. In some implementations, the inventory server 104 may enable the storage and organization of information associated with network hardware devices and their digital twins, as well as network resource capacity measurements.

In certain implementations, the inventory server 104 may be connected (e.g., via a network, such as a Local Area Network (LAN), an intranet, an extranet, or the Internet) to other computer systems. The inventory server 104 may operate in the capacity of server or a client computer in a client-server environment, or as a peer computer in a peer-to-peer or distributed network environment. Inventory server 104 may be provided by a personal computer (PC), a web appliance, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for completing events of a workflow process.

The inventory server 104 includes a processing device such as a processor(s) 330, a memory 302 which includes multiples: a main memory (e.g., read-only memory (ROM), flash memory, dynamic random access memory (DRAM) (such as synchronous DRAM (SDRAM) or DRAM (RDRAM), etc.) and a static memory (e.g., flash memory; a static random access memory (SRAM), etc.), and a data storage device (e.g. data store), which communicate with each other via a bus 370.

Processor 330 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processor 330 may also be one or more special-purpose processing devices such as an application specific integrated circuit (ASIC), a field programmable gate array (FPGA), a digital signal processor (DSP), network processor, or the like. The processor 330 is configured to execute processing logic for performing the operations and steps discussed herein.

The inventory server 104 may further include a network communication interface 360 communicably coupled to a network 110. The inventory server 104 also may include a video display unit such as display 340 (e.g., a liquid crystal display (LCD) or a cathode ray tube (CRT)), an input/output interface 350 including an alphanumeric input device (e.g., a keyboard) and, or a cursor control device (e.g., a mouse), and an optional signal generation device (e.g., a speaker).

The memory 302 may include a computer-readable storage medium (e.g., a non-transitory computer-readable storage medium) on which may store instructions encoding any one or more of the methods or functions described herein, including instructions encoding a mapping module 314 for implementing methods for mapping asset data 310 based on location data 312 to generate network topography and a map of network resource capacity allocation throughout the network also reside, completely or partially, within volatile memory and/or within processor(s) 330 during execution thereof by inventory server 104, hence, volatile memory of memory 302 and processor(s) 330 may also constitute machine-readable storage media.

The network asset data 310 may be one or more databases storing information about the various network assets, network hardware devices, deployed within the network, or in storage awaiting deployment. This information may include device identifiers, technical specifications, deployment location data, resource capacities, resource allocation, etc. The inventory server 104 may also include location data 312, which includes resource requirements for portions of the network. Locations may be physical, such a room, with resource requirements that include power and plug. Similarly, locations may include logical locations such as a portion for the network or a subnet.

Figure 4A:
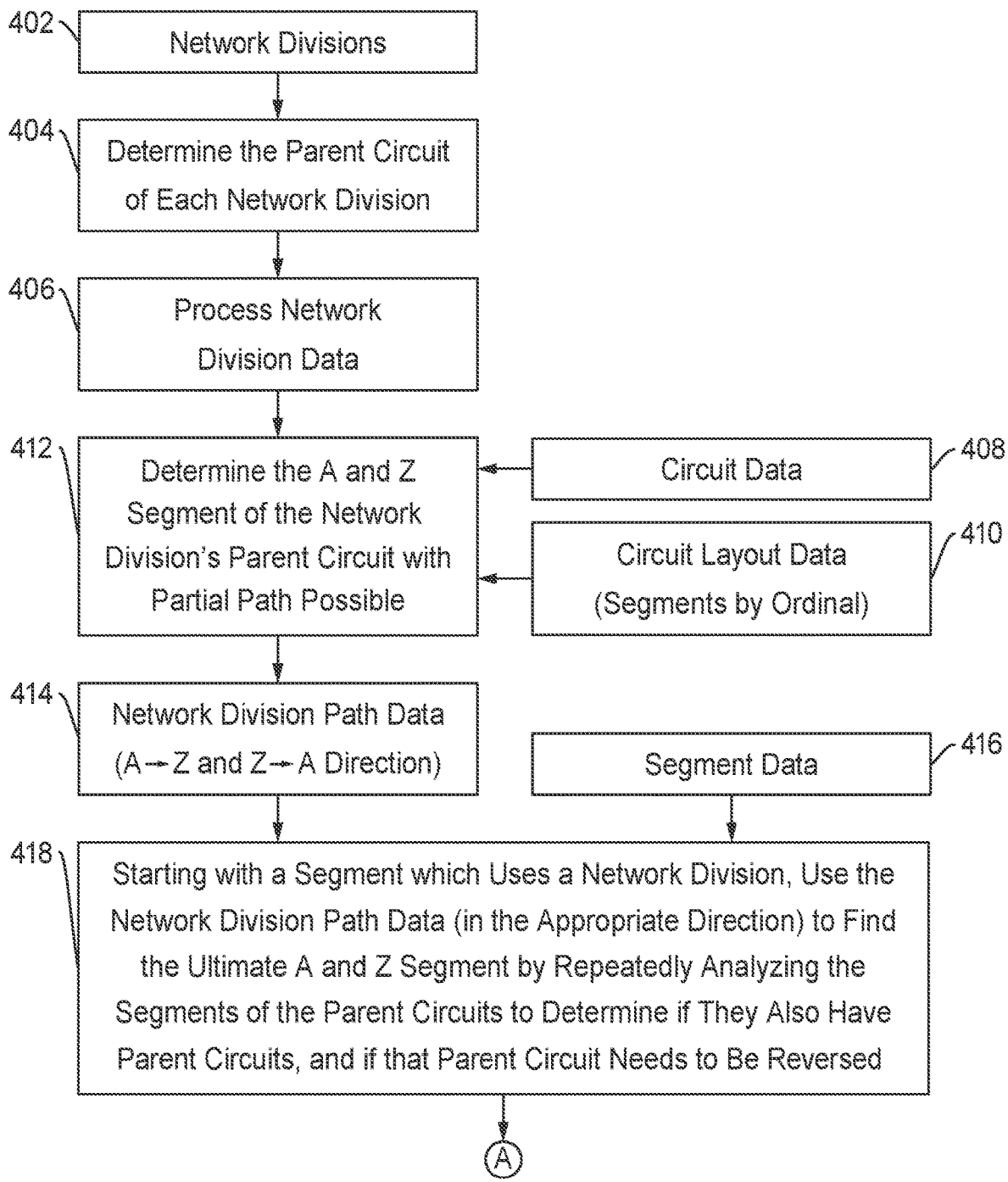
FIG. 4A shows a flowchart for the logic used in the database query of the connection data to visualize a circuit path according to disclosed embodiments.
Figure 4B:
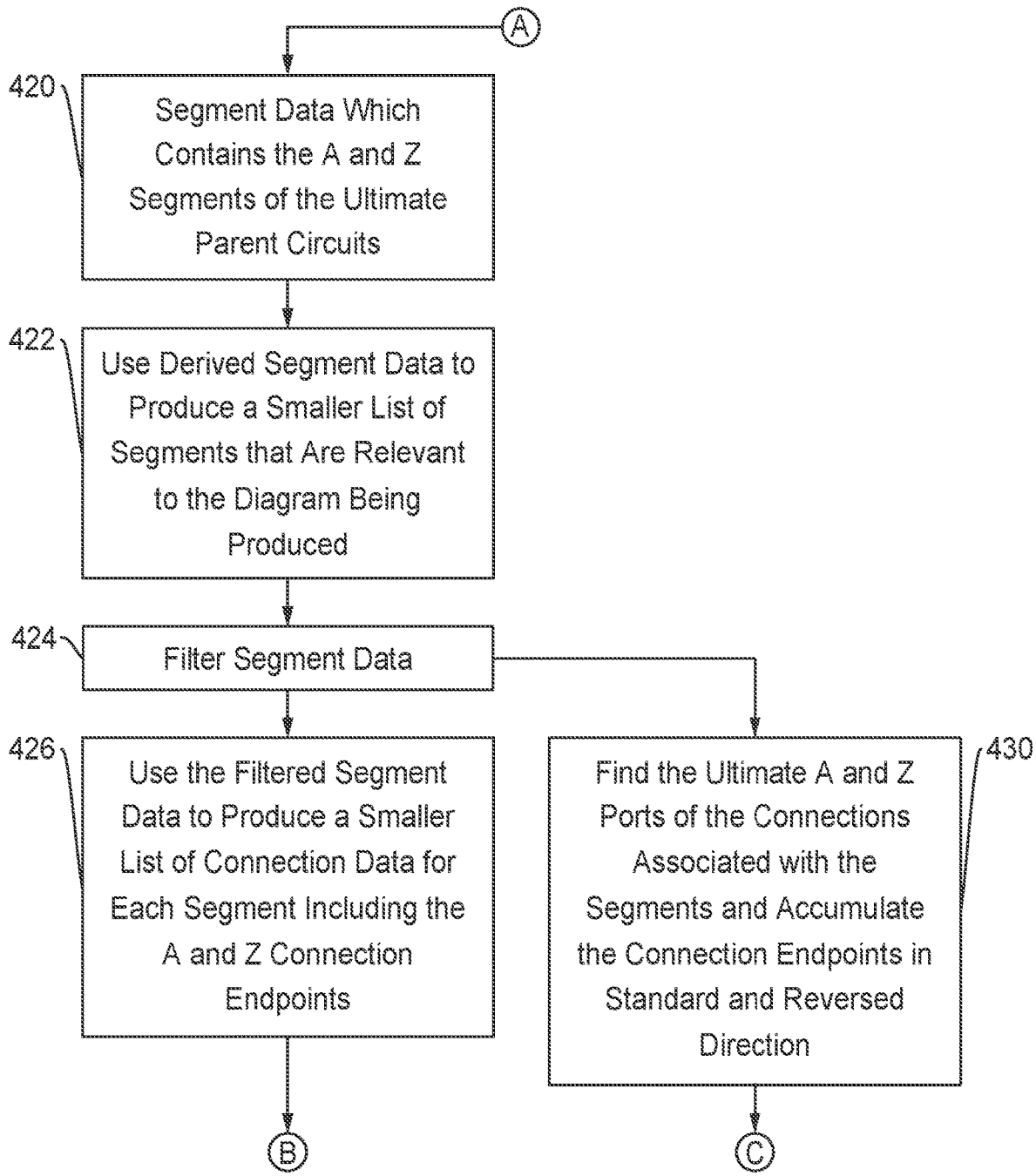
FIG. 4B further shows the flowchart for the logic used in the database query of the connection data to visualize a circuit path according to the disclosed embodiments.
Figure 4C:
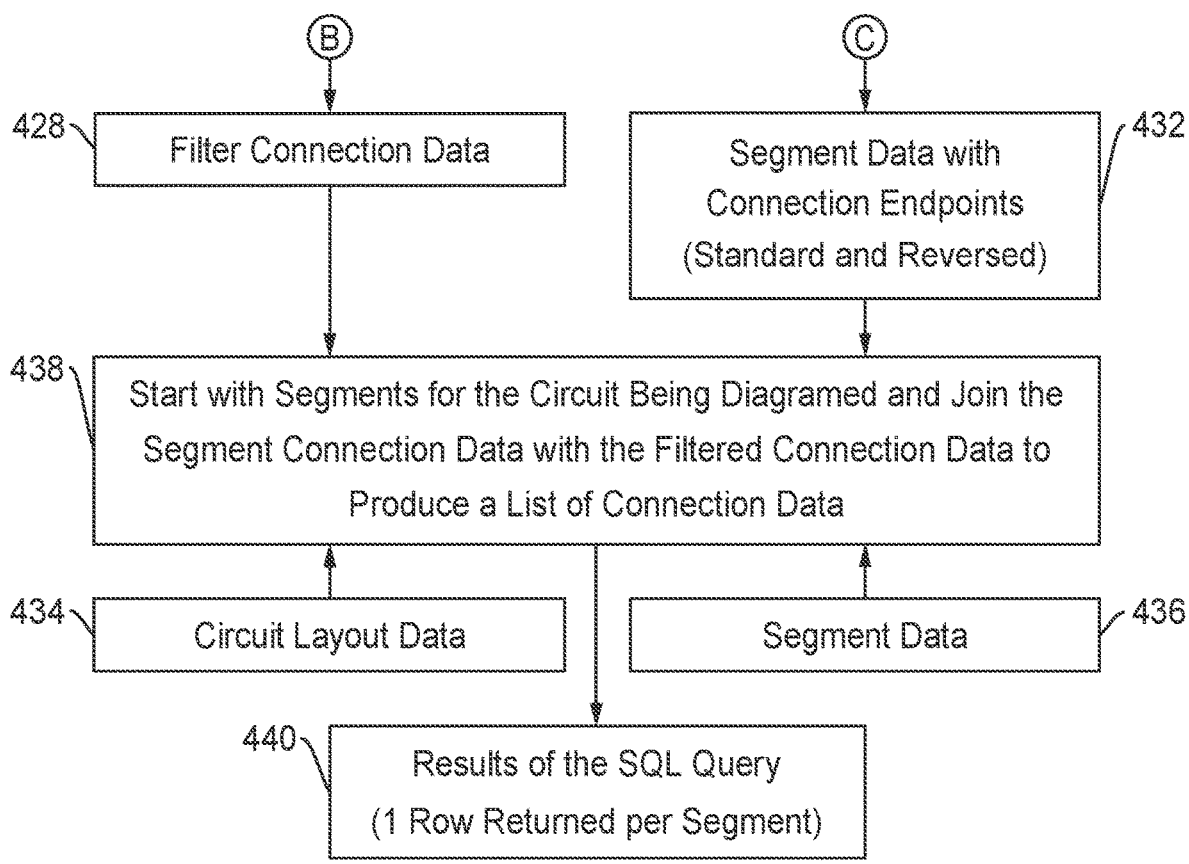
FIG. 4C further shows the flowchart for the logic used in the database query of the connection data to visualize a circuit path according to the disclosed embodiments.

FIG. 4 depicts a flowchart 400 for the logic used in the database query of the connection data to visualize a circuit path according to various embodiments. Flowchart 400 may refer to FIGS. 1-3 for illustrative purposes. Flowchart 400, however, is not limited to the embodiments disclosed by FIGS. 1-3.

Step 402 executes by providing network divisions to the management computing device 102 to execute the database query on inventory server 104. The disclosed embodiments allow users to create capacity, also known as network divisions, as a way to divide and allocate bandwidth or capability across a circuit. The allocations may be wavelengths, channels, virtual local area networks (VLANs), and the like. Other circuit paths may use the network divisions created in place of a normal segment. Circuits that have network divisions may be referred to as infrastructure circuits.

Referring to FIGS. 5A-H, several options are shown for documenting connections in one segment, where a segment represents part of the path of a circuit. The ports of the devices are what are stored to represent a connection. Connections may be pre-built outside of a segment, and then used in a segment, in either the initial or reversed direction.

Figure 5A:
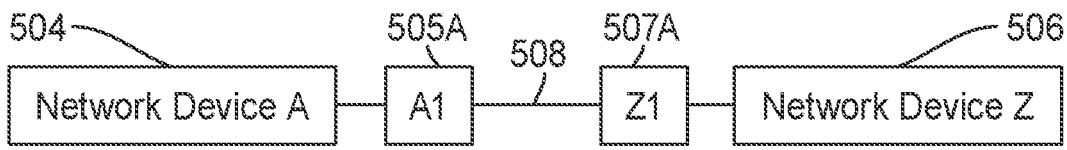
FIG. 5A shows a simple one connection segment according to the disclosed embodiments.

Referring to FIG. 5A, a simple one connection segment 502 is shown. Physical connection 508 connects network device A 504 to network device Z 506. Connection segment 502 may refer to network device A 504 is the "initial" device and network device Z 506 as the "destination" device in that a diagram would show data flowing from network device A 504 to network device Z 506. Physical connection 508 connects to network device A 504 using port 505, or A1. Physical connection 508 connects to network device Z 508 using port 507, or Z1.

Figure 5B:
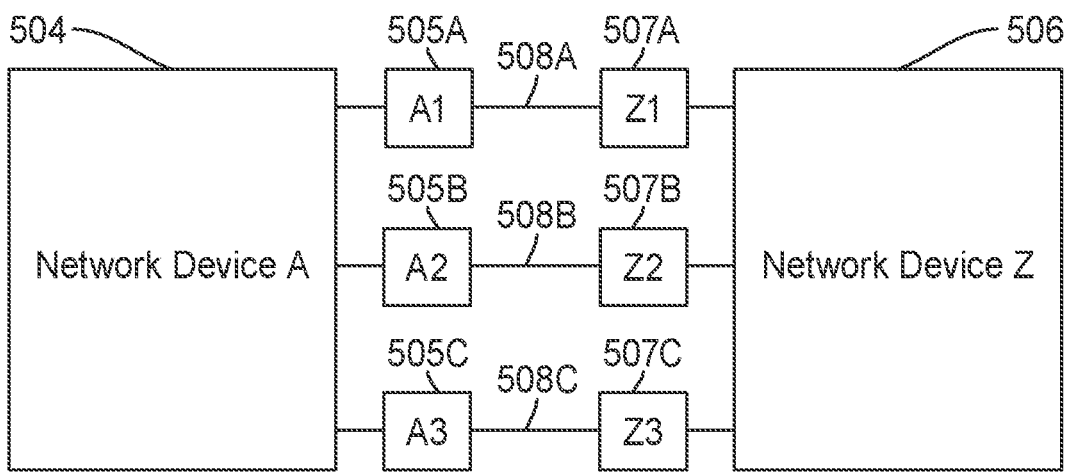
FIG. 5B shows multiple parallel physical connections in one segment according to the disclosed embodiments.

Referring to FIG. 5B, multiple parallel physical connections 508A-C in a connection segment 510 is shown. Connection segment 510 may resemble connection segment 502 except that is has multiple physical connections 508A-C. The different physical connections may utilize different ports on the respective devices. For example, network device A 504 is connected to network device Z 506 to exchange data. Different ports may be used at the respective devices for each connection. For example, physical connection 508A may connect to port A1 505A to port Z1 507A. Data sent from port A1 505A on network device A 504 will be received at port Z1 507A. In turn, physical connection 508B may connect to port A2 505B of network device A 504 and port Z2 507B of network device Z 506. Physical connection 508C may connect to port A5 505C of network device A 504 and port Z3 507C of network device Z 506. Data may be sent over one of the three physical connections.

Figure 5C:
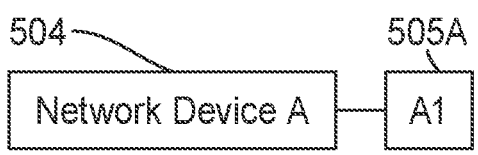
FIG. 5C shows a connection segment when the remote side is unknown according to the disclosed embodiments.

Referring to FIG. 5C, a connection segment 512 shown as one sided when the remote side is unknown. As shown, network device A 504 is shown with a physical connection that is not connected to a network device, such as network device Z 506. The remote side is "unknown." Nothing is known about the device to which network device A 504 is sending data. The details of that device are unknown to the entity documenting the circuit path. Port A1 505A is not connected to anything, though it may still be sending data through segment 512.

Figure 5D:
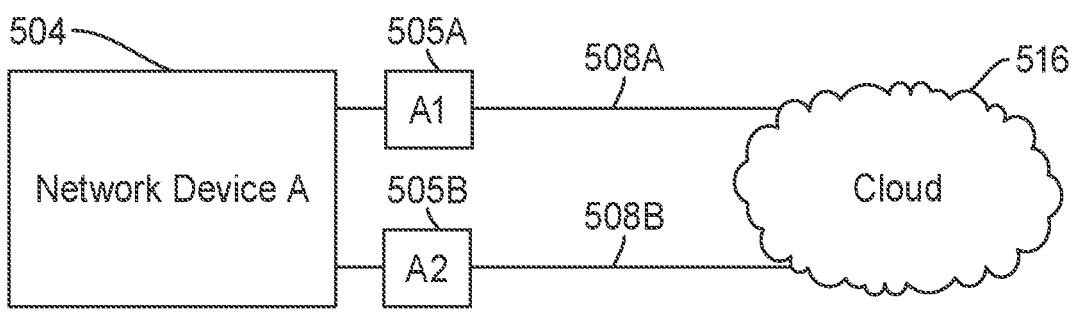
FIG. 5D shows a connection segment having a cloud representation according to the disclosed embodiments.

Referring to FIG. 5D, an abstract cloud representation, or cloud 516, may be used to represent an unknown side of connection segment 514. Network device A 504 is connected to cloud 516 using physical connections 508A and 508B. Network device A 504 sends data to a destination that is not known, and may be shown as cloud 516. Cloud network 516 is connected to ports A1 505A and A2 505B at network device A 504. Connection segment 514 exchanges data to and from network device A 504 using port A1 505A and port A2 505B. No corresponding ports are shown for cloud 516.

Referring to FIG. 5E, a connection segment 518 having multiple parallel asymmetrical physical paths is shown. Network device A 504 is connected to network device Z 506 by physical connection 508A, similar to connection segment 502 shown in FIG. 5A. Connection segment 518 also includes a parallel physical path having network device B 520 and network device C 522. Thus, data may flow from network device A 504 to network device Z 506 through one of the two paths. Network device A 504 is connected by physical connection 508A to network device Z 506 using port A1 505A and port Z1 507A, respectively.

Alternatively, a path may include port A2 505B of network device A 504 connected by physical connection 508B to port B1 524A of network device B 520. Network device B 520 is connected to network device C 522 by port B2 526A through physical connection 508C to port C1 528A. Network device C is connected to network device Z 506 by port C2 530A through physical connection 508D to port Z2 507B. These two paths may provide some redundancy to connection segment 518 in that if one path is down or slow, the disclosed embodiments may direct data over the alternative path. Alternatively, the parallel paths may represent different paths for transmit versus receive.

Referring to FIG. 5F, parallel paths for a connection segment 531 is shown according to the disclosed embodiments. One path may be between network device A 504 and network device Z 506 using physical connection 508A and port A1 505A and port Z1 507A, respectively. A second, or parallel, path may be between network device B 520 and network device Z 506. The parallel paths are not required to terminate at the same device. A single segment may contain any number of parallel paths. Each path can have any number of intermediate devices. The paths are not required to terminate at a single device on each side.

Thus, the second path may include network device C 522 being connected between network device B 520 and network device Z 506. Network device B 520 uses port B1 524A to connect to physical connection 508B, which is connected to port C1 528A of network device C 522. In turn, network device C 522 uses port C2 530A to connect to physical connection 508D, which is connected to port Z2 507B of network device Z 506. The paths do have one common device, network device Z 506, to connect the paths. Otherwise, the devices and connections are separate. Connection segment 531 may be used to show multiple paths ending in one device, or location.

Referring to FIG. 5G, a circuit path 532 having two segments 534 and 536 according to the disclosed embodiments is shown. A path may contain any number of segments. Each segment is a single connection for simplicity. Each segment, however, may be one of the previous examples shown in FIGS. 5A-F. The left end of circuit path 532 may be called the A end and the right end may be called the Z end according to the disclosed embodiments.

Circuit path 532 includes segment 534, which includes network device A 504 and network device B 520. They may be connected between port A1 505A and port B1 524A. Although not shown, segment 534 may include a physical connection between ports 505A and 524A. Circuit path 532 also includes segment 536, which includes network device B 520 and network device C 522. These devices may be connected between port B2 526A and port C1 528A.

Referring to FIG. 5H, a circuit path 533 having a ring topology according to the disclosed embodiments is shown. Circuit path 533 may include segment 534 and segment 536, as disclosed in FIG. 5G. It also includes segment 538. Circuit path 533 may start at a device, pass through multiple intermediate devices, and terminate at the starting device. The disclosed embodiments will recognize that as a ring topology, which impacts how the circuit diagram will be shown when another circuit uses the ring as part of its path. Segment 538 completes the ring topology by connecting network device C 522 to network device A 504, which is the starting device. Port C2 530A of network device C 522 is connected to port A2 505B of network device A 504. The data incoming to network device A 504 inputs through a different port than the outgoing data.

Referring to FIG. 5I, a circuit path 541 having a cloud 540 as a component according to the disclosed embodiments is shown. Circuit path 541 may include segment 542 and segment 544. Circuit path 541 may start at network device A 504 and connect to cloud 540 via port A1 505A. Cloud 540 may act as its own segment for circuit 541. Cloud 540 then may connect back to network device A 504 using port A2 505B and segment 544.

In some embodiments, cloud 540 may connect to other devices, such as network device B 520 or network device Z 506. Cloud 540 may be treated as a segment even though it may use additional components not shown in FIG. 5I.

As disclosed above, the disclosed embodiments allow users to create capacity as a way to divide up and allocate resources across the circuit path. Referring to FIG. 6A, an infrastructure circuit 602 having network divisions according to the disclosed embodiments is shown. Circuit path 532 as disclosed by FIG. 5G may be one network division. Infrastructure circuit 602 also includes network division 604 and network division 606. These network divisions may be separate circuit paths having their own segments, using the examples disclosed above. Resources may be allocated over the network divisions of the circuit paths.

For example, infrastructure circuit 602 may reuse bandwidth. High speed links may exist in circuit path 532 (as its own network division) and network divisions 604 and 606. Infrastructure circuit 602 itself may be a 100 GB connection. Dozens of circuit paths serving any number of customers may exist. The links may get part of the bandwidth available over infrastructure circuit 602. The disclosed embodiments may keep track of traffic. For example, circuit path 532 may get 10 GB of bandwidth while network division 604 gets 20 GB and network division 606 gets 15 GB. The remaining bandwidth may be allocated over other network divisions, not shown. The bandwidth may be reused. Further, different wavelengths of light are emitted over the fibers connecting the network division in infrastructure circuit 602. Customers connected to network division 604 may get data at a wavelength of A while customers connected to network division 606 may get data at a wavelength of B.

Referring to FIG. 6B, a partial path may be designated by network division 610 according to the disclosed embodiments is shown. Circuit path 532 may be a network division, as disclosed above. Network division 610 may be a partial path in that it connects network device A 504 to network device B 520 and does not extend to network device C 522. Infrastructure circuit 608 may deliver data through circuit path 532 as a first network division from network device A 504 to network device C 522. It also may deliver data through network division 610 to part of infrastructure circuit 608. This example may apply to a customer using network device B 520, which is an end point in the connection to the customer.

Figure 6C:
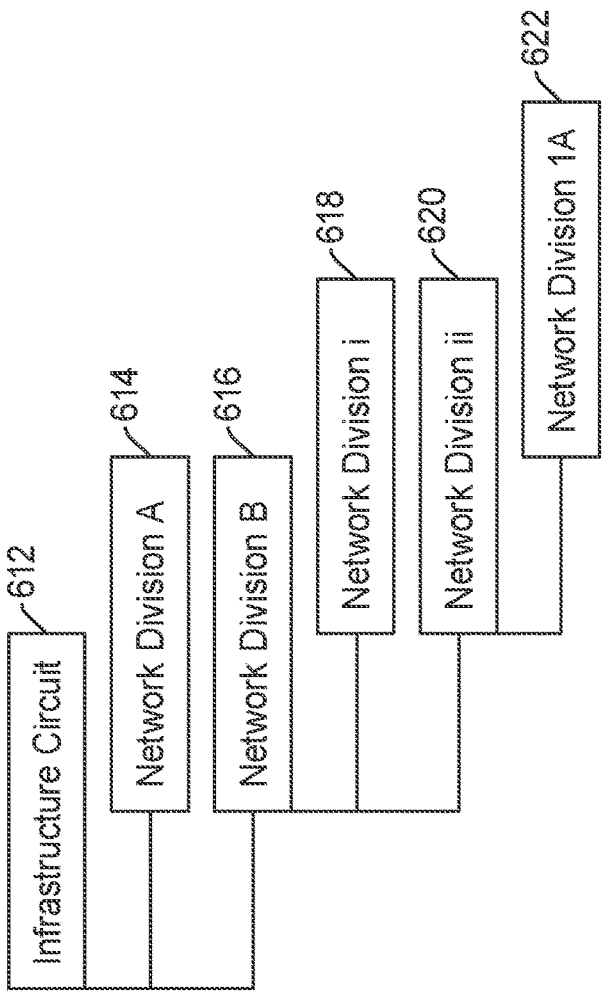
FIG. 6C shows a block diagram of a hierarchical structure of an infrastructure circuit according to the disclosed embodiments.

Referring to FIG. 6C, a block diagram of a hierarchical structure of an infrastructure circuit 612 according to the disclosed embodiments is shown. Infrastructure circuit 612 may be similar to infrastructure circuits 602 and 608 disclosed above. Network divisions may be arranged in any arbitrary hierarchical structure. The parent of a network division is an infrastructure circuit, or another network division. Thus, network divisions 614 and 616 may comprise infrastructure circuit 612. Network division 616 may be further broken down into network divisions 618 and 620. Resources allocated to network division 616 may be allocated to network divisions 618 and 620. Network division 620 also may be broken down into network division 622.

The network divisions may include one or more of the connection segments disclosed above. Thus, as can be appreciated, infrastructure circuits may include a large variety of different circuit configurations, which with parent and child network divisions, also having their own large variety of circuit configurations. The disclosed embodiments account for the different configurations and allocation of resources within the network divisions.

Figure 6D:
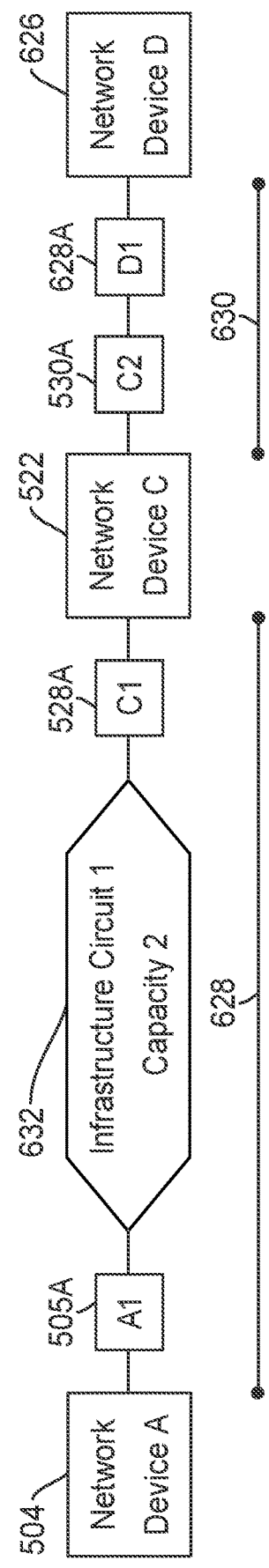
FIG. 6D shows a circuit path having an infrastructure circuit according to the disclosed embodiments.

Referring to FIG. 6D, a circuit path 624 having an infrastructure circuit 632 according to the disclosed embodiments is shown. When a user is building a circuit path, they may choose to use the capacity of an infrastructure circuit as a segment in the local path. When this happens, the disclosed embodiments need to determine the path of the infrastructure circuit so it can be integrated into the local circuit diagram as the local path is drawn. The infrastructure circuit may be reduced to its endpoints to simplify the diagram.

Circuit path 624 includes network device A 504 and network device C 522. It also includes network device D 626 as an end point. Port D1 628A of network device D 626 may connect to port C2 530A of network device C 522. Between network device A 504 and network device C 522 is infrastructure circuit 632. Infrastructure circuit 632 may be further broken down into segments, network divisions, and the like, but is shown here as one unit for brevity. Port A1 505A of network device A 504 is connected to infrastructure circuit 632, which is connected to port C1 528A of network device C 522. Data may flow through these ports from network device A 504 to network device C 522 via infrastructure circuit 632.

FIG. 6D also shows segment 628. Segment 628 is linked to a capacity element of another circuit. Two segments in the infrastructure circuit are reduced to one to simplify the diagram. Segment 630 includes the connection between network device C 522 and network device D 626, so it does not need to be reduced. When a user creates a segment that uses capacity from a parent circuit, the endpoints for the parent that will be displayed locally are either the ultimate A (left side) and Z (right side) endpoints if the capacity is not using a partial path, or the endpoints of the furthest left and right segments of the partial path.

Referring to FIG. 6E, circuit path 634 having a reversed infrastructure circuit 640 according to the disclosed embodiments is shown. Circuits have no preferred direction. When the capacity from an infrastructure circuit is used, the user may decide to flip, reverse, the infrastructure circuit locally. The reversal of the path is only happening locally. Other circuits can reuse the infrastructure circuit in its original direction without being affected.

Circuit path 634 includes network device A 504, network device C 522, and network device D 626, but the devices are arranged differently than previous circuits. Here, network device C 522 is at the left most, or A side, while network device D 626 is at the right most, or Z side. Circuit path 634 includes segment 636 and segment 638. Segment 636 may be reversed from the arrangement of segment 624 shown in FIG. 6D. Infrastructure circuit 640 may be infrastructure circuit 632, but flipped or reversed such the network divisions of the circuit are arranged in the reverse order of infrastructure circuit 632.

Thus, port C1 528A of network device C 522 is connected to one end of infrastructure circuit 640 and port A1 505A of network device A 504 is connected to the opposite end. These connections may be the same as those in segment 628, but in the opposite direction. Segment 636 still uses capacity from infrastructure circuit 640. Other circuits may use infrastructure circuit 640 in its original directions, such as the one used by infrastructure circuit 632.

Referring to FIG. 6F, a circuit path 642 having segments 644 and 646 according to the disclosed embodiments is shown. A single segment may reuse multiple parent circuits. Each one may be used in its standard direction or its reversed direction. Circuit path 642 includes segment 644 having two infrastructure circuits. Segment 646 may be similar to segment 638 disclosed above to connect network device A 504 to network device D 626.

Segment 644, however, includes infrastructure circuit 648 and infrastructure circuit 650 between network device C 522 and network device A 504. The network devices may use separate ports for each infrastructure circuit. Thus, port C1 528A of network device C 522 is connected to infrastructure circuit 648, which, in turn, is connected to port A1 505A of network device A 504. Port C2 528B of network device C 522 is connected to infrastructure circuit 650, which, in turn, is connected to port A2 505B of network device A 504. The infrastructure circuits include their own network divisions and connection segments, which may differ from each other.

Further, infrastructure circuit 648 may include two segments that are configured to be reversed from its original A to Z direction. Infrastructure circuit 650 may include three segments that are configured in their original direction. The disclosed embodiments account for these different topologies.

Figure 6G:
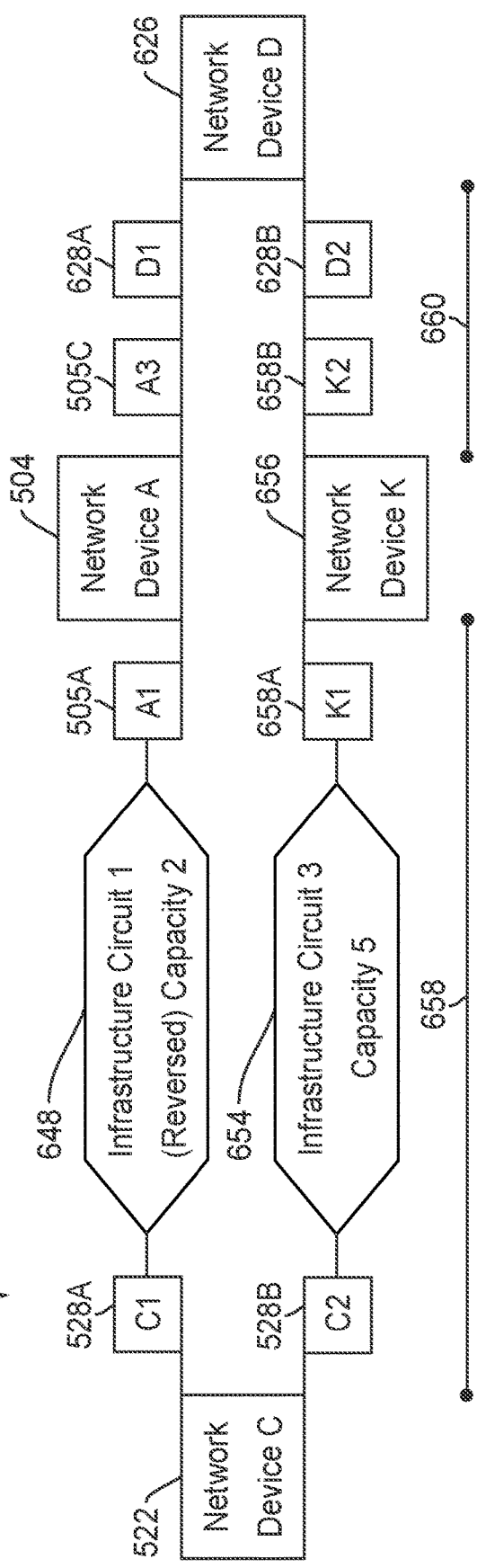
FIG. 6G shows a circuit path having multiple segments with parallel physical connections according to the disclosed embodiments.

Referring to FIG. 6G, a circuit path 652 having segments 658 and 660 according to the disclosed embodiments is shown. Circuit path 652 may be similar to circuit path 642 in that it includes infrastructure circuit 648 and infrastructure circuit 654 along separate paths within segment 658. Circuit path 652, however, differs from circuit path 642 in that the infrastructure circuits do not terminate to the same device. Like the parallel physical connections in a single segment, if capacity from multiple infrastructure circuits is used, then they may terminate in different devices for the subsequent segment.

Infrastructure circuit 654 is connected to network device C via port C2 528B. Infrastructure circuit 654 may have a capacity of 5, or 5 network divisions therein. Thus, it may take on more capacity to reuse network divisions. Infrastructure circuit 654 also is connected to network device K 656 via port K1 658A. Infrastructure circuit 648 is connected to network device C 522 and network device A 504, as disclosed above in circuit path 642. Thus, the infrastructure circuits shown for segment 658 are connected to separate devices for segment 660.

Segment 660 also includes parallel physical connections as network device A 504 is connected to network device D 626 via ports A3 505C and D1 628A. Network device K 656 also is connected to network device D 626 using ports K2 658B and D2 628B. Further, circuit path 652 may include a third parallel physical connection between network device C 522 and network device D 626. In other words, network device C 522 may be directly connected to network device D 626 using a physical connection, as disclosed in connection segments above.

Figure 6H:
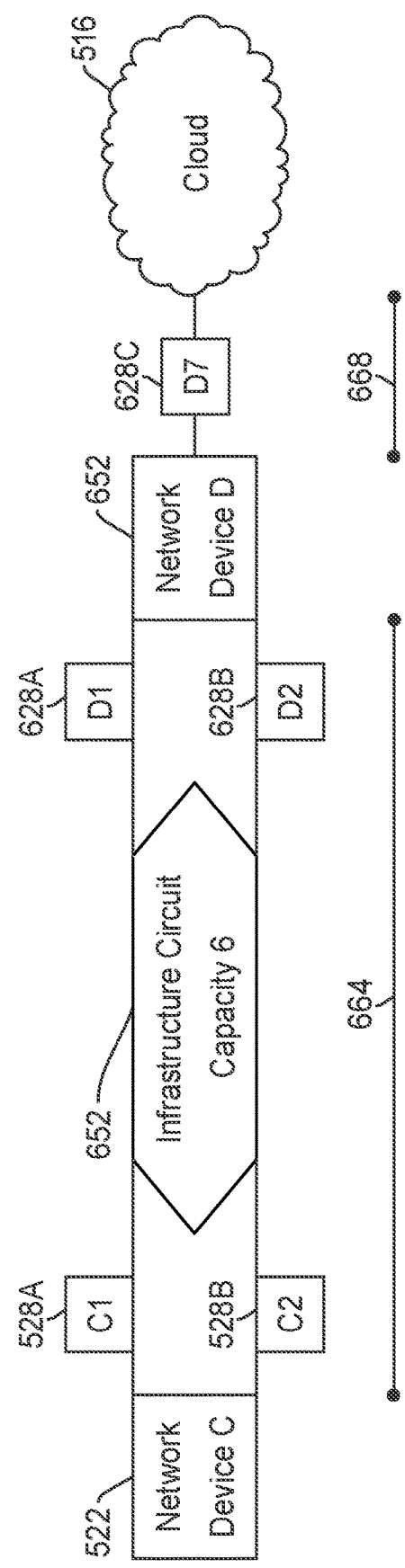
FIG. 6H shows a circuit path having a reused infrastructure circuit according to the disclosed embodiments.

Referring to FIG. 6H, a circuit path 662 having a reused infrastructure circuit, shown as circuit path 652, according to the disclosed embodiments is shown. Circuits with segments that reuse other circuits can themselves be reused in segments of other circuits. Thus, circuit path 652 may be an infrastructure circuit connected to network device C 522 and network device D 652, as shown in FIG. 6G. The parallel physical connections from circuit path 652 may be connected to ports C1 528A and C2 528B of network device C 522 and ports D1 628A and D2 628B of network device D 652. This portion of circuit path 662 is segment 664. Segment 664 uses capacity from circuit path 652.

Network device D 652 may be connected to cloud network 516 through port D7 628C. Segment 668 may include these connections. Thus, network device C 522 may send data to cloud network 516 through one of many paths shown by circuit path 662. The disclosed embodiments, therefore, may represent any number of circuit configurations as well as the relationships between the different devices within the circuits.

Referring back to FIG. 4, step 402 includes providing network divisions for a circuit path. Step 404 executes by determining the parent circuit of each network division. Referring to the examples provided above, FIG. 6C shows how network divisions may be used to comprise infrastructure circuit 612. Step 406 executes by providing processed division data from the determinations made in step 404. Step 408 executes by providing circuit data. Step 410 executes by providing circuit layout data, or segments by ordinal.

Step 412 executes by determining the A, or left, side segment and the Z, or right, side segment of the parent circuit of the network division with partial path possible. Step 414 executes by generating network division path data. This data may be the devices and circuits in the A side segment to Z side segment direction and the Z side segment to A side segment direction. Step 416 executes by providing segment data 416.

Step 418 executes by, starting with a segment that uses a network division, using the network division path data determined above (in the appropriate direction) to find the ultimate A and Z segments by repeatedly analyzing the segments of the parent circuits to determine if they also have parent circuits, and if the parent circuit needs to be reversed. Step 420 executes by generating segment data that contains the A and Z segments of the ultimate parent circuits for the network division.

Step 422 executes by using derived segment data to produce a smaller list of segments that are relevant to the diagram being produced. Step 424 executes by generating filtered segment data. Flowchart 400 may split off to two separate paths. In one path, step 426 executes by using the filtered segment data to produce a smaller list of connection data for each segment, including the A and Z connection endpoints. Step 428 executes by generating filtered connection data.

In the other path for flowchart 400, step 430 executes by finding the ultimate A and Z ports of the connections associated with the segments. Step 430 also accumulates the connection endpoints in the standard and reversed direction. Step 432 executes by generating segment data with connection endpoints, both standard and reversed. Steps 428 and 432 then proceed to step 438.

Steps 410 and 416 are repeated, with the resulting data provided to step 438. Step 438 executes by joining the segment connection data with the filtered connection data to produce a list of connection data, starting with segments for the circuit being diagrammed. Thus, flowchart 400 shows the steps used to preprocess the data for a circuit path in order to do a database query, as shown in step 440. Step 440 provides the results of a database query using the data generated and analyzed above. One row may be returned per segment of the circuit path.

Figure 7:
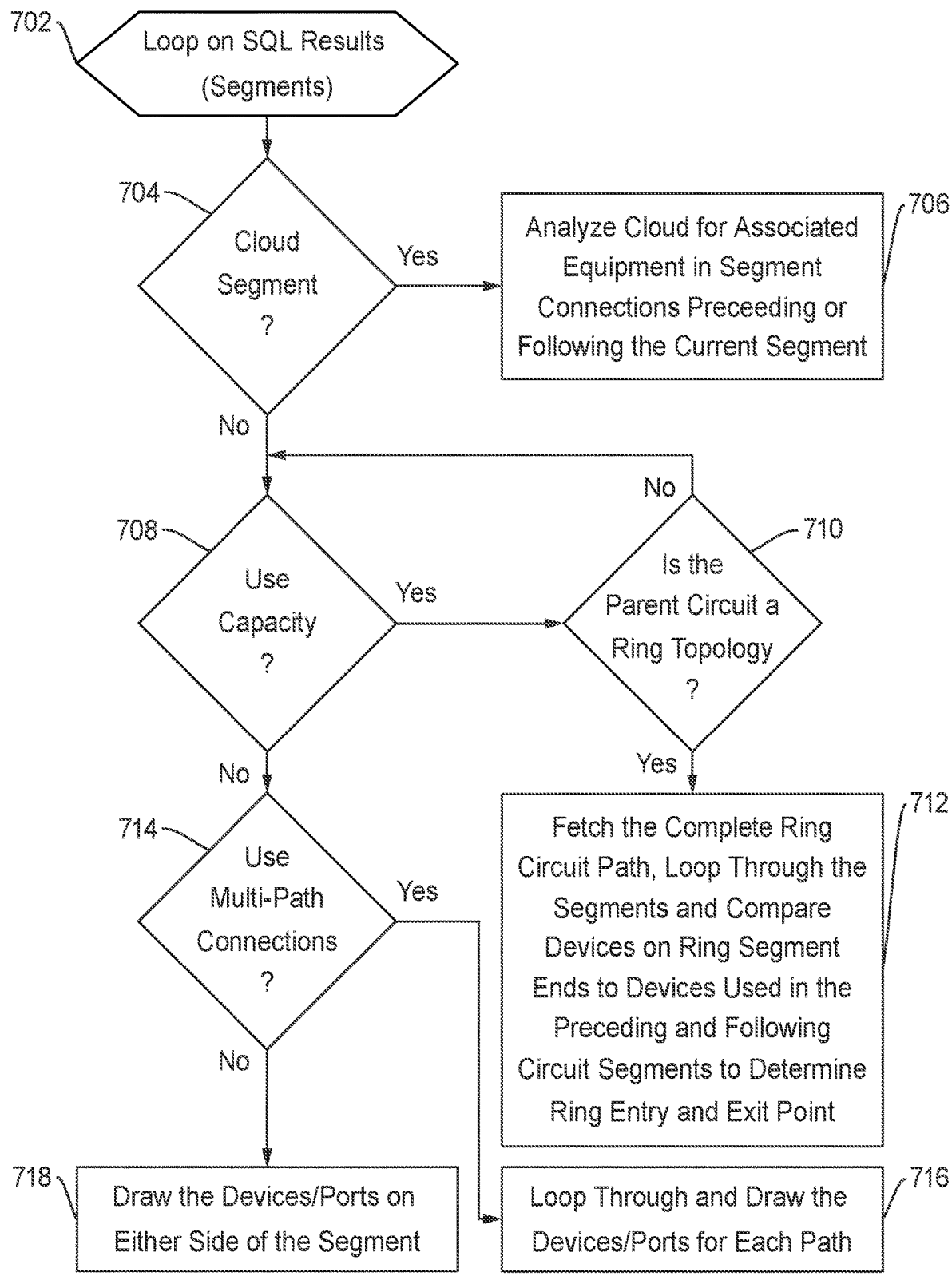
FIG. 7 shows a flowchart for the logic used in the code that processes the database query and draws the diagram according to the disclosed embodiments.

FIG. 7 depicts a flowchart 700 for the logic used in the code that processes the database query and draws the diagram according to the disclosed embodiments. Flowchart 700 may refer to FIGS. 1-6H for illustrative purposes. Flowchart 700, however, is not limited to the embodiments disclosed by FIGS. 1-6H. Flowchart 700 also may refer to FIG. 8.

Step 702 executes by looping on the structured query language (SQL) results provided in step 440. The SQL results may be in the form of segments of the circuits. Step 704 executes by determining whether a segment is a cloud segment, such as the one shown in FIG. 5D. If yes, then step 706 executes by analyzing the cloud segment to determine if it is associated with equipment involved in the connections of the segments preceding or following the current segment. For example, in FIG. 6H, an analysis of segment 664 would indicate that a cloud network 516 follows the segment. If so, then the disclosed embodiments note this fact.

If step 704 is no, then step 708 executes by determining whether the segment uses capacity. If yes, then step 710 executes by determining whether the parent circuit is a ring topology. If step 710 is yes, then step 712 executes by fetching the complete path of the ring circuit, looping through the segments, and comparing the devices on either end of the ring segment to the devices used in the connections on the preceding and following circuit segments to determine the entry and exit point of the ring. The disclosed embodiments would then note the ring topology information.

If step 708 is no, then step 714 executes by determining whether the segment uses multi-path connections. If yes, then step 716 executes by looping through the paths and drawing the devices and ports for each path. This information is noted according to the disclosed embodiments. If step 714 is no, then step 718 executes by drawing the devices and ports on either side of the segment. Thus, the disclosed embodiments draw or illustrate a circuit path using the segments and the data provided in the results of the SQL query.

Figure 8:
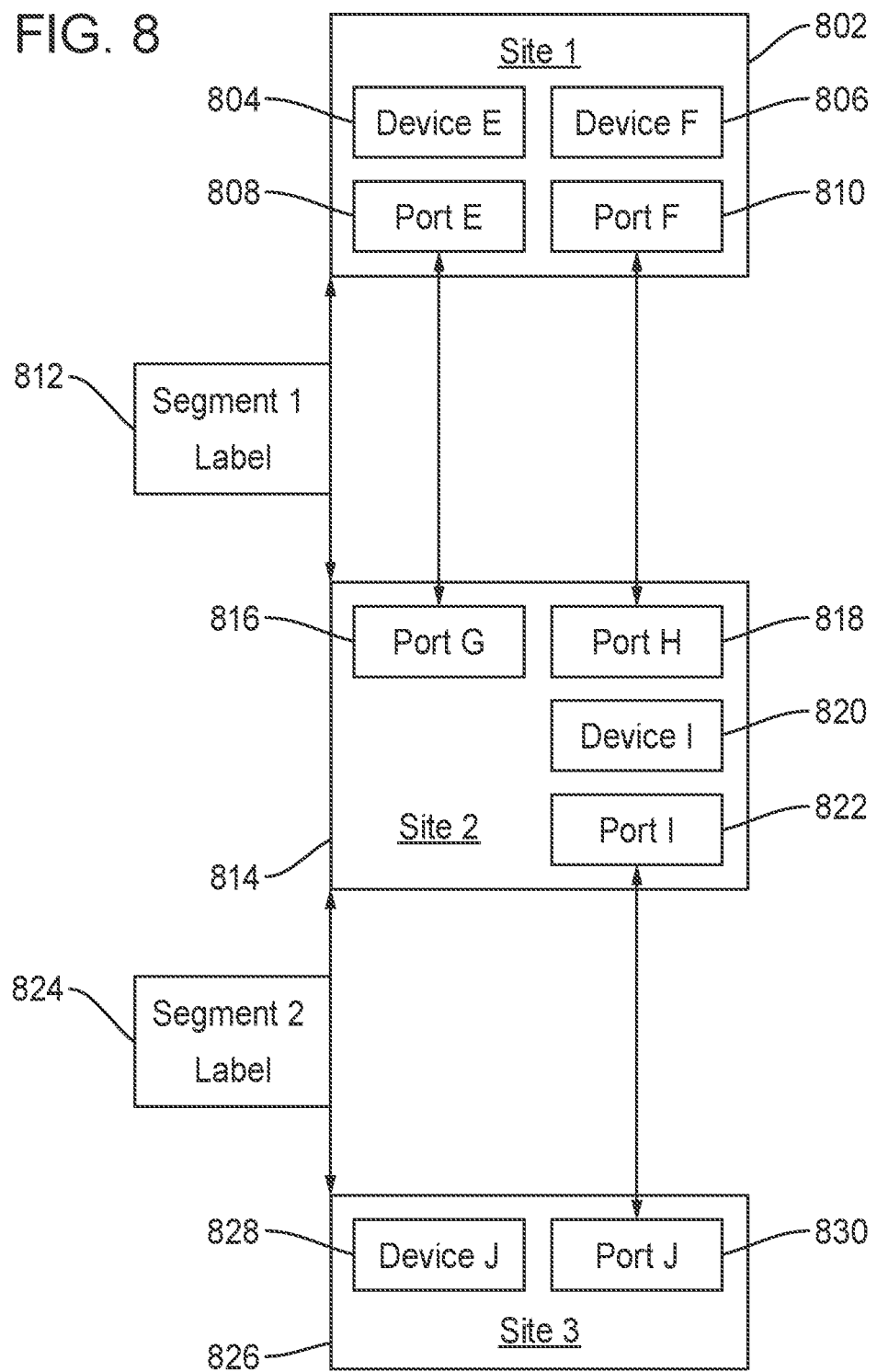
FIG. 8 shows a block diagram of a circuit path within buildings according to the disclosed embodiments.

FIG. 8 depicts a block diagram of a circuit path 800 within buildings according to the disclosed embodiments. The disclosed embodiments may execute flowcharts 400 and 700 to gather and analyze the data needed to create the diagram of circuit path 800. As disclosed above, a segment may contain physical connections. A segment also may be using existing capacity from parent circuit(s). The segment also may represent a cloud network. A cloud network is an intentionally vague concept that consists of a list of edge devices, or the entry points to the cloud network.

Circuit path 800 includes building 802, which serves as the A end of circuit path 800. The "A" end may be considered the start or beginning of circuit path 800. The disclosed embodiments determine that building 802 includes a device 804 and a device 806. Building 802 also includes port 810 and port 808. Ports 810 and 808 are connected to segment 812, which may include an infrastructure circuit or network division.

Segment 812 may include two parallel paths between port 808 of building 802 and port 816 of building 814 and between port 810 of building 802 and port 818 of building 814. Building 814 also is connected to segment 812. Building 814 includes device 820. Ports 816 and 818 may route data to device 820. Building 814, however, includes a single port to segment 824, or port 822. Segment 824 may include a single path to building 826, which is the Z end of circuit path 800. Segment 824 is connected to port 830. Building 826 includes device 828 to receive the data from segment 824.

The disclosed embodiments may map out circuit path 800 according to the logic used in flowchart 700. Circuit path 800 is determined using the disclosed processes to generate a diagram that is readable and easy to review for the different circuit paths involved. A user may select a segment 812 or 824 to review in greater detail.

Figure 9:
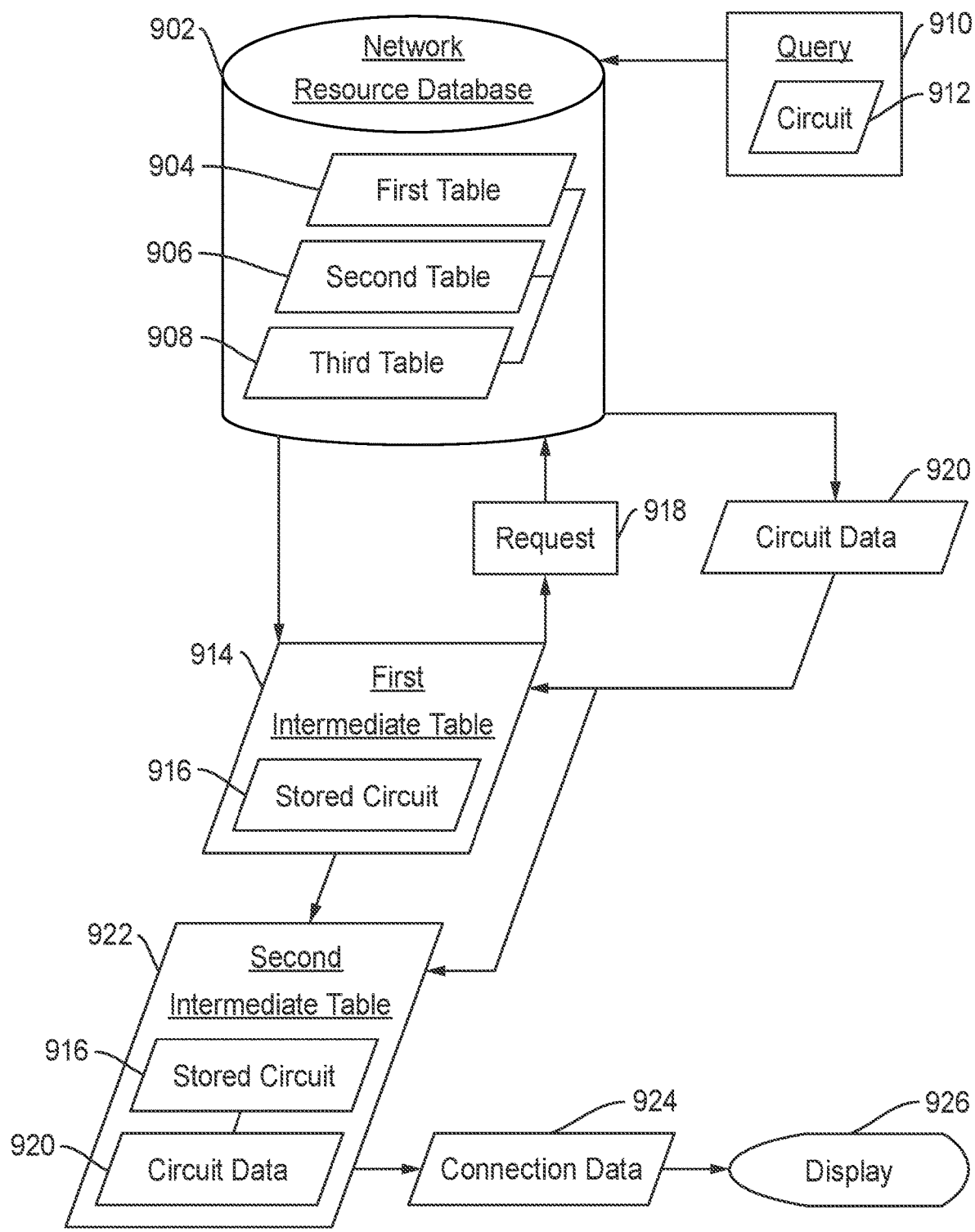
FIG. 9 shows a block diagram of a system for managing network resources using a network resource database according to the disclosed embodiments.

FIG. 9 shows a block diagram of a system 900 for managing network resources using a network resource database 902 according to the disclosed embodiments. Network resource database 902 may be populated using the embodiments disclosed by FIGS. 4A-C above. Network resource database 902 includes a plurality of tables of information that are joined through identifications within the tables. In other words, the tables may include data on the circuits identified through the processing of capturing the segments, devices, and capacities of the circuits, as disclosed above. As shown, circuits may be complicated and extensive.

For example, network resource database 902 may include first table 904, second table 906, and third table 908. Network resource database 902 includes many other tables that are not shown due to brevity. All of the tables may be connected with data calls to each other. For example, first table 904 may include entries that require data from entries in second table 906, which, in turn, these entries require data from third table 908. As may be appreciated, such relationships across a large number of tables may result in complicated paths for circuits within network resource database 902.

According to the disclosed embodiments, a query 910 is received for a desired circuit 910. Circuit 910 corresponds to data within network resource database 902. Preferably, query 910 requests a topology for circuit 910, which only may include a subset of information of the overall circuit of interest. For example, referring to FIG. 5G, a location for network device A 504 along with a location for network device C 522 may be provided. Query 910 seeks to retrieve the data and information relates to the segments and components also included within circuit 532.

The disclosed embodiments automatically preprocess the data retrieved from network resource database 902 to better identify the data needed to provide the connection data for circuit 912. Tables within network resource database 902 may be processed to generate first intermediate table 914 that includes information about a stored circuit or circuits 916. Stored circuit 916 may include information and data related to circuit 912 of query 910. For example, referring to FIG. 6E, query 910 may request information about circuit 634, which includes segments 636 and 638 as well as parent circuit 640 along with other components. Stored circuit 916 may include information and data on at least part of these features of circuit 634.

Preprocessing the results may occur by first intermediate table 914 sending a request 918 to further query network resource database 902 for additional information and data. Using the above example, request 918 may require additional information and data regarding parent circuit 640, having a capacity 2. Parent circuit 640 also may a reversed circuit of one already identified within the tables of network resource database 902. For a complicated circuit, there may be many such queries needed for additional information and data.

Network resource database 902 responds to request 918 with additional circuit data 920. This additional data may be further data for stored circuit 916. In some embodiments, first intermediate table 914 may be updated with circuit data 920. In other embodiments, second intermediate table 922 may be generated to allow additional preprocessing to occur, if needed. For example, the circuit data for parent circuit 640 may include a child circuit that needs more information and data from network resource database 902. If so, then that information and data is retrieved and added to stored circuit 916.

After preprocessing is completed, connection data 934 is provided for query 910. Circuit 912 may have requested information for circuit 634. This information and data is provided to display 926 of a device. Connection data 924 shows the information and data for stored circuit 916 along with the additional circuit data provided in the intermediate tables. Connection data 924 may provided to a display 926 to visually show a user the circuit, its connections, the devices, the segments, and capacity as found during the database query.

Thus, according to the disclosed embodiments, a visual presentation is generated of complicated network circuits that may encompass numerous devices and segments. The data is processed and stored in network resource database 902. A database query uses logic to process the connection data to provide the visualized circuit path. Instead of slowly going through the database to determine the circuit path or paths, the disclosed embodiments generate an intermediate table having one or more segments in the circuit path. The disclosed embodiments then query network resource database 902 to obtain further data about the one or more segments.

Figure 10:
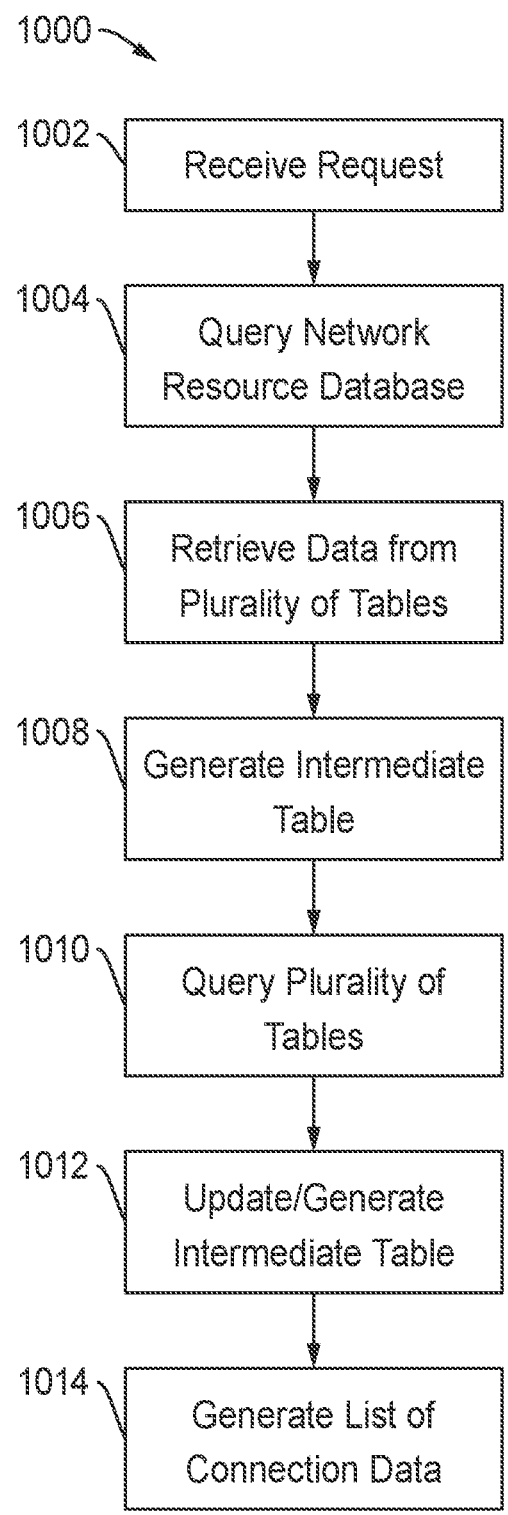
FIG. 10 shows a flowchart for processing a query for a circuit within a network using network resource database according to the disclosed embodiments.

FIG. 10 depicts a flowchart 1000 for processing a query for a circuit within a network using network resource database 902 according to the disclosed embodiments. Flowchart 1000 may refer to FIGS. 1-9 for illustrative purposes. Flowchart 1000, however, is not limited to the embodiments disclosed by FIGS. 1-9.

Step 1002 executes by receiving a request for a desired circuit within a network of communication devices. The communication devices may be located in different locations and use connections to transmit and receive communications. In some embodiments, the connections may be fiber optic connections for communication networks. Referring to FIG. 9, query 910 includes circuit 912, which may be one or more circuits of interest in the network.

Step 1004 executes by querying network resource database 902 with information for the desired circuit. Network resource database 902 may be queried for circuit 912. Step 1006 executes by retrieving data from the plurality of tables within network resource database 902. For example, network resource database 902 may includes a large number of tables, of which first table 904, second table 906, and third table 908 are shown. Data within first table 904 has a relationship with data within second table and a relationship with data within third table 908. The data and these relationships are retrieved.

Step 1008 executes by generating an intermediate table based on the data retrieved from the plurality of tables. This data includes data on at least one stored circuit within network resource database 902. Examples of circuits stored in network resource database 902 are disclosed above. Different circuits may be provided in the intermediate table, such as first intermediate table 914. The data includes segments within the circuit or circuits. In some segments, additional information may be needed from network resource database 902.

Thus, step 1010 executes by further querying the plurality of tables within network resource database 902 to retrieve information or data about the segment of the circuit. The segment may include another circuit or a reversed orientation of an identified circuit. For example, request 918 may query for additional information or data on a segment stored circuit 916. This segment may include a circuit that requires data from additional tables within network resource database 902.

Step 1012 executes by updating the intermediate table with the results of request 918 for the information or data about the segment. In some embodiments, first intermediate table 914 is updated to reflect circuit data 920 retrieved for stored circuit 916. In other embodiments, second intermediate table 922 is generated. Additional queries may be made until all possible configurations for stored circuit 916 are obtained. Thus, the results of query 910 may be preprocessed when providing the desired circuit information.

Step 1014 executes by generating a list of connection data from the data of stored circuit 916 for desired circuit 912. A visual representation is generated of the components, segments, capacities, and other information of the circuit retrieved from network resource database 902. The list of connection data may be provided to display 926 of a device to the user requesting query 910.

It is to be understood that the above description is intended to be illustrative, and is not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "identifying", "updating", "copying", "publishing", "selecting", "utilizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein. The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method for managing network resources, the method comprising:
    populating a network resource database with a plurality of circuits, wherein a circuit of the plurality of circuits includes at least one segment, by
        determining a first path between two devices for the at least one segment, wherein the two devices include a first device and a second device;
        identifying a capacity for the at least one segment, wherein the capacity relates to a bandwidth available to the at least one segment,
        generating a data set for the circuit of the plurality of circuits, wherein the data set includes the first path, the devices, and the capacity for all of the at least one segment with the respective circuit, and
        storing the data set of the circuit of the plurality of circuits in the network resource database;
    generating a query of the network resource database for a desired circuit of the plurality of circuits;
    preprocessing the query including the data set of the circuit of the plurality of circuits; and
    returning a result for the desired circuit including the first path, the devices, and the capacity corresponding to the circuit of the data set.

2. The method of claim 1, wherein the first path is a physical connection between the two devices.

3. The method of claim 2, further comprising
    determining a first port on the first device and a second port on the second device to form the physical connection; and
    including the first port and the second port for the physical connection within the data set for the circuit.

4. The method of claim 1, wherein the at least one segment includes a plurality of network divisions that form the capacity, each of the network divisions using a portion of the bandwidth within the at least one segment.

5. The method of claim 4, further comprising including the plurality of network divisions for the at least one segment within the data set for the circuit.

6. The method of claim 5, further comprising identifying a network division of the network divisions within the at least one segment for the result for the desired circuit.

7. The method of claim 1, further comprising determining a second path for the at least one segment, wherein the second path includes a separate physical connection between the two devices from a physical connection for the first path.

8. A method for managing network resources using a network resource database, the method comprising:
    receiving a request for a desired circuit within a network;
    querying the network resource database with information for the desired circuit;
    retrieving data from a plurality of tables within the network resource database;
    generating an intermediate table based on the data from the plurality of tables, wherein the intermediate table includes data of a stored circuit related to the desired circuit;
    further querying the plurality of tables for data related to a segment of the stored circuit;
    updating the intermediate table with the data related to the segment; and
    producing a list of connection data from the data of the stored circuit for the desired circuit using the intermediate table.

9. The method of claim 8, further comprising determining a network division within the segment of the stored circuit, wherein the network division corresponds to the desired circuit.

10. The method of claim 9, further comprising deriving the segment of the stored circuit from the network division.

11. The method of claim 10, further comprising, starting with the segment using the network division, using network division path data to determine a final segment for the list of connection data by analyzing at least one segment of a parent circuit for the stored circuit.

12. The method of claim 11, further comprising determining if the parent circuit needs to be reversed.

13. The method of claim 11, further comprising retrieving data for the parent circuit from the plurality of tables within the network resource database.

14. The method of claim 13, further comprising updating the intermediate table based on the data for the parent circuit.

15. The method of claim 8, further comprising automatically querying the network resource database for additional circuit data if the list of connection data includes a cloud segment.

16. The method of claim 8, further comprising automatically querying the network resource database for additional data if a parent circuit of the stored circuit uses a ring topology.

17. The method of claim 8, further comprising automatically querying the network resource for additional circuit data of the segment of stored circuit.

18. A network capacity resource management system comprising:
    a processor;
    a memory in communication with the processor and having stored thereon, processor-executable instructions for configuring the processor to perform operations comprising
        receiving a request for a desired circuit within a network;
        querying a network resource database within the network capacity resource management system with information for the desired circuit;

retrieving data from a plurality of tables within the network resource database;

generating an intermediate table based on the data from the plurality of tables, wherein the intermediate table includes data of a stored circuit related to the desired circuit;

further querying the plurality of tables for data related to a segment of the stored circuit;

updating the intermediate table with the data related to the segment; and producing a list of connection data from the data of the stored circuit for the desired circuit using the intermediate table.

19. The network capacity resource management system of claim 18, further comprising a user interface to display the list of connection data.

20. The network capacity resource management system of claim 18, further comprising an inventory server to support the network resource database.

* * * * *